(12) United States Patent
Chou et al.

(10) Patent No.: US 9,706,337 B2
(45) Date of Patent: Jul. 11, 2017

(54) SYSTEMS, APPARATUS, METHODS AND COMPUTER-READABLE STORAGE MEDIA FACILITATING MULTIPLE DEVICE COORDINATION IN WIRELESS COMMUNICATION SYSTEMS

(71) Applicant: Taiwan Semiconductor Manufacturing Company, Ltd., Hsinchu (TW)

(72) Inventors: Chie-Ming Chou, Hsinchu (TW); Ching-Yao Huang, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 14/299,502

(22) Filed: Jun. 9, 2014

(65) Prior Publication Data

US 2015/0105114 A1 Apr. 16, 2015

Related U.S. Application Data

(60) Provisional application No. 61/891,863, filed on Oct. 16, 2013.

(51) Int. Cl.
*H04W 40/22* (2009.01)
*H04W 72/04* (2009.01)
(Continued)

(52) U.S. Cl.
CPC ............ *H04W 4/006* (2013.01); *H04W 8/005* (2013.01); *H04W 88/06* (2013.01)

(58) Field of Classification Search
CPC ...... H04W 40/22; H04W 76/02; H04W 72/04
See application file for complete search history.

(56) References Cited

U.S. PATENT DOCUMENTS 9,025,550 B2 * 5/2015 Zhu .................. H04L 5/0035
370/252
2003/0137970 A1 * 7/2003 Odman ................ H04L 29/06
370/350
(Continued)

OTHER PUBLICATIONS

Purnachand S. et al, "Performance Analysis of Open Loop and Closed Loop Power Control Schemes for LTE Uplink," International Journal of Computer Science and Information Technologies, 2012, pp. 3683-3688, vol. 3, Department of Electronics and Communication Engineering, K L University, India, 6 Pages.

(Continued)

*Primary Examiner* — Bobbak Safaipour
(74) *Attorney, Agent, or Firm* — Haynes and Boone, LLP

(57) ABSTRACT

Multiple device coordination (MDC) in a wireless communication system is described. For example, a method includes identifying, by a coordinating device associated with an entity, one or more non-coordinating devices of a network and associated with the same entity. The method also includes coordinating a single, shared radio connection to which the coordinating device and the one or more non-coordinating devices are communicatively coupled. In some instances, coordination is performed via initializing, management and/or transmission stages. For example, from a set of candidate devices, a coordinating device and the non-coordinating devices are determined during the initialization stage. The coordinating device can be selected based on any number of different factors including, but not limited to, proximity to base station, transceiver power, resources, screen size and/or based on a selection made by the entity.

28 Claims, 26 Drawing Sheets

(51) Int. Cl.
*H04W 76/02* (2009.01)
*H04W 4/00* (2009.01)
*H04W 8/00* (2009.01)
*H04W 88/06* (2009.01)

(56) References Cited

U.S. PATENT DOCUMENTS

2013/0142056 A1 6/2013 Abplanalp et al.
2013/0170414 A1 7/2013 Kwon

OTHER PUBLICATIONS

Dusza, et al., "An Accurate Measurement-Based Power Consumption Model for LTE Uplink Transmissions," 2013, pp. 49-50, IEEE, 2 Pages.

* cited by examiner

SYSTEMS, APPARATUS, METHODS AND COMPUTER-READABLE STORAGE MEDIA FACILITATING MULTIPLE DEVICE COORDINATION IN WIRELESS COMMUNICATION SYSTEMS

CROSS REFERENCE TO RELATED APPLICATION AND CLAIM OF PRIORITY

This application is a non-provisional of, and claims priority to, U.S. Provisional Patent Application No. 61/891,863, filed Oct. 16, 2013, and titled "Method and Apparatus for Multiple Device Coordination," which is incorporated herein by reference in its entirety.

TECHNICAL FIELD

The disclosed subject matter relates generally to wireless communications, and, more particularly, to multiple device coordination (MDC) in wireless communication systems.

BACKGROUND

As wireless technologies become ubiquitous and the pace of development of wireless applications quickens, the likelihood that users will desire the ability to efficiently utilize different wireless devices in a vast array of environments increases. In some cases, users carry multiple devices that execute different applications. However, operating each of the different devices is likely to result in transmission and/or energy inefficiency. The problem is exacerbated by limited radio resources that can result in restricted system capacity.

SUMMARY

The following presents a simplified summary of the disclosed subject matter in order to provide a basic understanding of some embodiments of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

In some embodiments, a method includes: identifying, by a coordinating device including a processor, one or more non-coordinating devices of a network and associated with a same entity; and coordinating a single, shared radio connection to which the coordinating device and the one or more non-coordinating devices are communicatively coupled, wherein the coordinating includes one or more operations associated with an initializing stage, a management stage or a transmission stage.

In some embodiments, an apparatus includes: a coordinating device including a processing device configured to at least: identify one or more non-coordinating devices in a network and associated with a same entity; and coordinate a single, shared radio connection to which the coordinating device and the one or more non-coordinating devices are communicatively coupled, wherein coordination of the single, shared radio connection includes one or more operations associated with initialization, management or transmission.

In some embodiments, a computer-readable storage device is described. The computer-readable storage device can have computer-executable instructions that, in response to execution, cause a coordinating device to perform operations. The operations can include identifying one or more non-coordinating devices of a network and associated with a same entity; and coordinating a single, shared radio connection to which the coordinating device and the one or more non-coordinating devices are communicatively coupled, wherein coordination of the single, shared radio connection includes one or more operations associated with initialization, management or transmission.

To the accomplishment of the foregoing and related ends, the disclosed subject matter, then, comprises the features hereinafter fully described. The following description and the annexed drawings set forth in detail certain illustrative embodiments of the disclosed subject matter. However, these embodiments are indicative of but a few of the various ways in which the principles of the disclosed subject matter may be employed. Other embodiments, advantages and novel features of the disclosed subject matter will become apparent from the following detailed description of the disclosed subject matter when considered in conjunction with the drawings.

DETAILED DESCRIPTION

Figure 1:
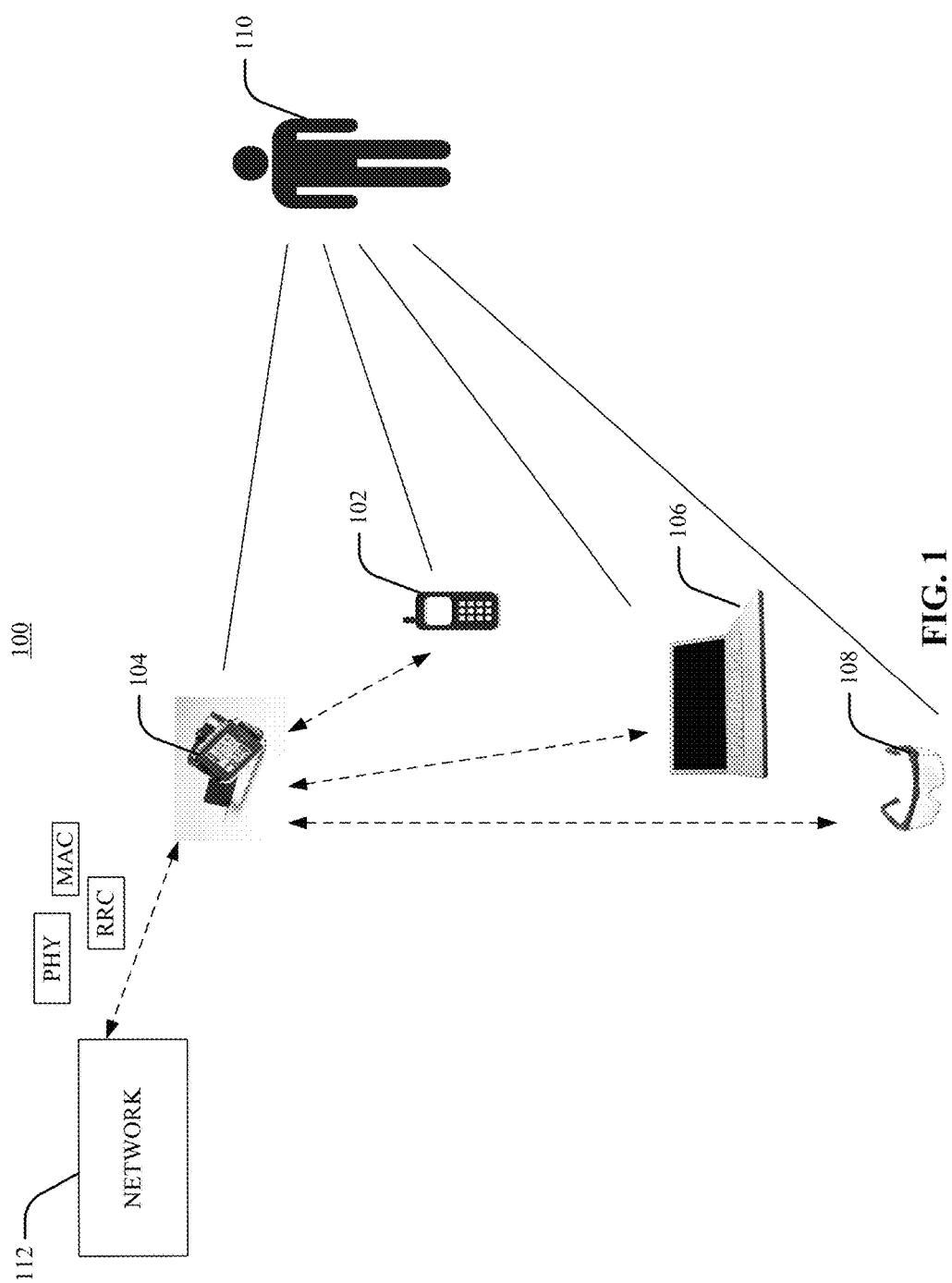
FIG. 1 is a diagram of an exemplary system in which MDC can be facilitated in accordance with one or more embodiments of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter can be practiced without these specific details. In other instances, various well-known structures and devices may be shown in block diagram form in order to facilitate describing the disclosed subject matter.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream. The foregoing terms are utilized interchangeably in the specification and related drawings. Likewise, the terms "access point," "base station," "Node B," "evolved Node B," "home Node B (HNB)," and the like, are utilized interchangeably in the application, and refer to a wireless network component or appliance that serves and receives data, control, voice, video, sound, gaming, or substantially any data-stream or signaling-stream from a set of subscriber stations. Data and signaling streams can be packetized or frame-based flows.

Wireless cellular technology has evolved over time to satisfy user demand. The evolution can be categorized into different generations with respective features. For example, third generation (3G) systems tend to employ code division multiple access (CDMA) technology while fourth generation (4G) systems tend to employ orthogonal frequency division multiple access (OFDMA) to provide mobile internet on the cellular network.

The focus has typically been increasing system capacity to provide for greater transmission efficiency. For example, capacity has increased exponentially and data rate has increased from 384 kilobits per second (kpbs) to 1 gigabits per second (Gbps) in attempts to support the surge in users with massive data transmission. In 4G systems, solutions being considered include bandwidth extension by carrier aggregation, aggressive frequency reuse via small cell deployment and/or spectral efficiency increase by deployment of multiple input multiple output (MIMO) systems.

However, since mobile internet has increased in popularity, the traffic model for cellular networks has changed. For example, the traffic types within a cellular network can cause diverse transmission issues and significantly reduce battery life of a device. 4G systems tend to focus on cell infrastructure and access behavior enhancement to support various requirements individually. With the deployment of wireless cellular technology, more and more portable devices are equipped with 4G (e.g., LTE) modules. For example, GOOGLE® Glass, APPLE® iWatch are portable wireless devices that can operate within 4G systems.

In systems in which numerous devices are associated with a single user, or entity (e.g., human entity, business entity or otherwise), and each has individual access to the network, congestion and/or corresponding throughput degradation can result.

Systems, apparatus, methods and/or computer-readable storage media described herein facilitate MDC in wireless communication systems. MDC can enable cooperative communication among devices associated with the same entity. As used herein, the terms "multi-device coordination" and "MDC" mean a system in which a coordinating device is selected from a set of candidate devices (which are associated with the same entity) to establish an RRC connection with a network for one or more of the candidate devices that are not coordinating devices (e.g., non-coordinating devices) to enable the non-coordinating devices to make transmissions with the network without establishing individual radio resource control (RRC) connections with the network. The non-coordinating devices are then transparent to the network.

One or more embodiments of the disclosed subject matter can advantageously support traffic steering and spectrum sharing to enable devices to achieve efficient transmission. Improved spectrum and energy efficiency can result. Resources can be shared among devices associated with the same entity, and access procedures can be simplified to one RRC connection (in lieu of each device associated with the same entity having a separate RRC connection to the network). Device power consumption can also be reduced. Moreover, data can be offloaded to devices according to coordinated approaches.

In the embodiments described, by applying described functionalities for MDC, the large number of associations between the network and devices, and the radio signaling, can be reduced. From the base station (BS) point of view, MDC can enable grouping two or more devices associated with the same entity and viewing the set of devices as a single device. Corresponding resources and/or identifiers can be assigned. From the device point of view, due to coordination among the devices associated with the entity, multiple antennas can be efficiently used to obtain transmission efficiencies.

From the network perspective, MDC can reduce mobility management loading (e.g., single handover preparation, X2 network interface negotiation can be used for MDC). MDC can also reduce simultaneous random access and consequently prevent, or reduce the likelihood of, radio resource control (RRC) connection request message collision since devices can have substantially identical moving speed and TAT might time out at approximately the same time. In some embodiments, MDC can also increase physical downlink control channel (PDCCH) efficiency since multiple devices can share a unique Cell Radio Network Temporary Identifier (C-RNTI) and control channel element (CCE). In some embodiments, MDC an also increase Physical Uplink Control Channel (PUCCH) efficiency since redundant channel quality indicator (CQI) reporting can be avoided since devices in MDC can have same modulation and control scheme (MCS).

The adaption of coordinating device may be transparent to the network whereby the C-RNTI and RRC configuration could be continuously applied after adaption. From the device perspective, MDC can lead to throughput gain. For example, a coordinating device can be adaptive among multiple devices based on the best fading situation and then better signal-to-interference-plus-noise ratio (SINR) choice can be selected between the BS and MDC. Throughput gain can also be achieved because MDC can support smart cooperative retransmission and/or support interference cancellation whereby one device can be designated to receive a signal from an interfering node and perform interference cancellation for another device that is communicating with the serving node.

From the device perspective, MDC can also lead to power saving gain. For example, in some embodiments, only one device needs to acquire/update the system information block (SIB) and receive RRC configurations. Therefore, MDC can enable other devices to stay in the sleep state as long as possible. Further, the non-coordinating device (NCD) can save baseband power consumption due to reduced control channel monitoring since only the coordinating device needs to monitor the PDCCH at the discontinuous reception (DRX) active period. In some embodiments, according to the power control mechanism, more allocated physical resource block (PRB) results and more transmission power may be needed; however, better power consumption efficiency can result due to the power amplifier characteristics. Hence, when MDC is enabled, data can be aggregated at the coordinating device and consequently transmitted to the BS employing PRBs. As a result, better energy efficiency can result.

FIG. 1 is a diagram of an exemplary system in which MDC can be facilitated in accordance with one or more embodiments of the disclosed subject matter. System 100 can include one or more of candidate devices 102, 104, 106, 108 associated with entity 110. Candidate devices 102, 104, 106, 108 can be associated with entity 110 by being owned, used or controlled by entity 110. In various embodiments, candidate devices 102, 104, 106, 108 can be any number of different mobile or stationary wireless devices including, but not limited to, a laptop, a smart phone, a display device (e.g., a head- or body-mounted display device) having wireless communication capability, a watch having wireless communication capability, a personal computer (PC), personal digital assistant (PDA) or the like. In some embodiments, one or more of candidate devices 102, 104, 106, 108 can include structure and/or functionality (e.g., hardware, software or a combination of hardware and software) to communicate with a wireless network, and/or to detect the presence of one or more of other candidate devices 102, 104, 106, 108. For example, in some embodiments, one or more of candidate devices 102, 104, 106, 108 can be configured to establish an RRC connection between a network (e.g., network 112) and/or other candidate devices 102, 104, 106, 108.

In various embodiments, entity 110 can be a natural person or a business entity or a household electric entity. For example, in one embodiment, entity 110 is a human user of candidate devices 102, 104, 106, 108. In another embodiment, entity 110 is a corporate entity that owns candidate devices 102, 104, 106, 108.

In the embodiment shown, candidate device 104 is selected as the coordinating device for candidate devices 102, 106, 108, which are each associated with entity 110. MDC can be facilitated in system 100 via an RRC connection between candidate device 104 and network 112. As such, resources (e.g., bandwidth, signaling resources) can be shared and/or efficiently utilized. As shown, candidate device 104 can establish an RRC connection with network 112 and exchange media access control (MAC) and physical layer (PHY) information over the established channel established. The channel can be the RRC connection between any one of candidate devices 102, 104, 106, 108 associated with entity 110 and network 112.

In some embodiments, subsets of candidate devices 102, 104, 106, 108 associated with entity 110 can have different coordinating devices that can perform the MDC for only candidate devices in the subset with the particular coordinating device. Turning back to FIG. 1, however, candidate device 104 can facilitate MDC between network 112 and candidate devices 102, 106, 108 (as well as candidate device 104) via initialization, management and/or transmission stages described in greater detail herein.

In some embodiments, any of candidate devices 102, 104, 106, 108 can include structure and/or functionality to be a coordinating device. In other embodiments, a subset of candidate devices 102, 104, 106, 108 can include structure and/or functionality to become the coordinating devices while remaining candidate devices 102, 104, 106, 108 can include limited structure and/or functionality for acting as only non-coordinating devices. In some embodiments, functionality of one or more of candidate devices 102, 104, 106, 108 can be updated from time to time such that a candidate device that included structure and/or functionality for acting as only a non-coordinating device can be configured to be able to serve as a coordinating device.

Figure 2:
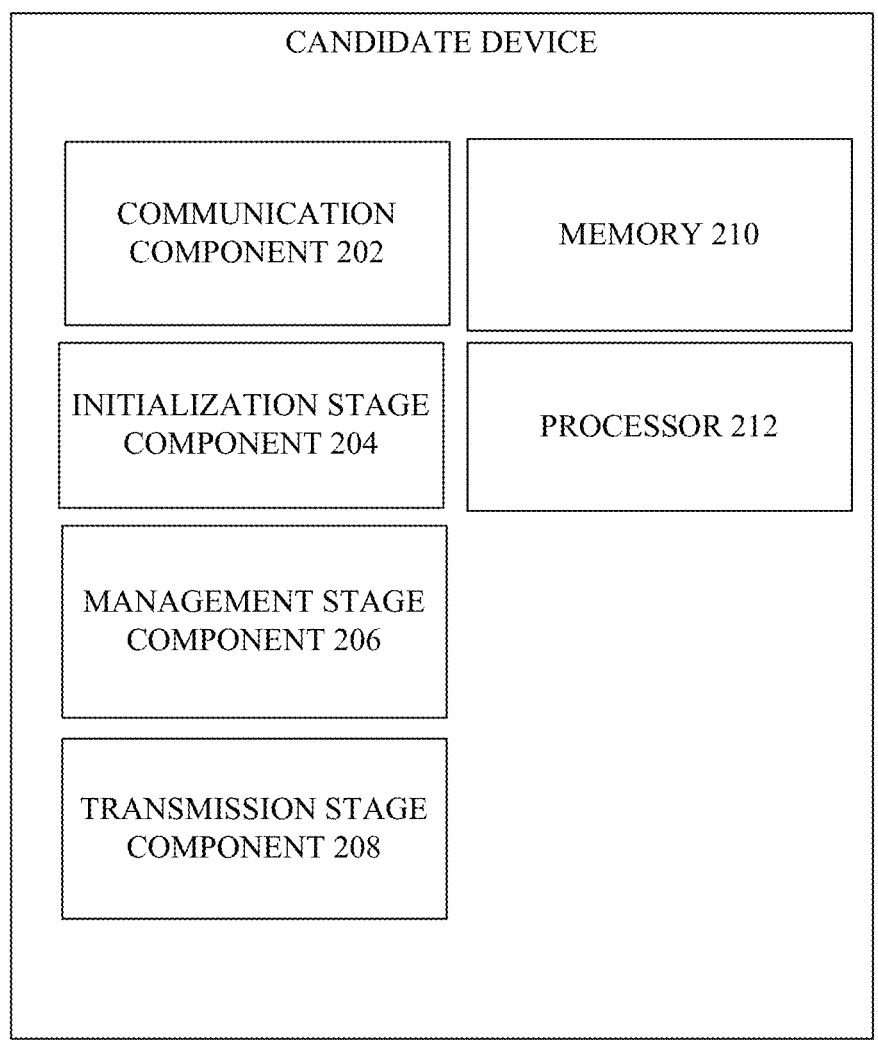
FIG. 2 is an illustration of a block diagram of an exemplary candidate device for which MDC can be facilitated in a wireless communication system in accordance with one or more embodiments of the disclosed subject matter.

Turning now to FIG. 2, shown is an illustration of a block diagram of an exemplary candidate device for which MDC can be facilitated in a wireless communication system in accordance with one or more embodiments of the disclosed subject matter. Candidate device 200 can include communication component 202, initialization stage component 204, management stage component 206, transmission stage component 208, memory 210 and/or processor 212. In various embodiments, one or more of communication component 202, initialization stage component 204, management stage component 206, transmission stage component 208, memory 210 and/or processor 212 can be electrically and/or communicatively coupled to one another to perform one or more functions of candidate device 200.

In some embodiments, candidate device 200 can include structure and/or functionality of any one of candidate devices 102, 104, 106, 108. Accordingly, in some embodiments, each of communication component 202, initialization stage component 204, management stage component 206, transmission stage component 208, memory 210 and/or processor 212 can be included in candidate devices 102, 104, 106, 108. However, in some embodiments, for example, for candidate devices configured to act as only non-coordinating devices, one or more of initialization stage component 204, management stage component 206, transmission stage component 208 may not be included.

In the embodiment described, candidate device 200 can include structure and/or functionality for optionally being able to be a coordinating device or a non-coordinating device. Accordingly, in the embodiments described, candidate device 200 can be or include the structure or functionality of candidate device 104 of FIG. 1. Further, in some embodiments, candidate devices 104, 200 can include structure and/or functionality of coordinating device 500 (and vice versa).

In other embodiments, candidate device 200 can be or include the structure and/or functionality of candidate devices 102, 106, 108. In these embodiments, candidate device 200 can include one or more components and/or have the capability to perform one or more functions associated with non-coordinating devices 502, 504 (and vice versa).

With reference to FIGS. 1 and 2, communication component 202 can transmit and/or receive information to and/or from a network (e.g., network 112) and one or more candidate devices (e.g., candidate devices 102, 106, 108) associated with the same entity with which candidate device 200 is associated. For example, in various embodiments, communication component 200 can transmit and/or receive RRC signaling information for establishing a connection with the network and/or information (e.g., text, voice, video, data) to be communicated to and/or from the network. In some embodiments, communication component 200 can transmit and/or receive information such as the distance between one or more of other candidate devices associated with the same entity and a base station (BS), power of transceivers of the candidate devices, resources of the candidate devices, whether the candidate devices are configured/pre-selected to be a coordinating device or a non-coordinating device, security information, mobility information, channel access information, information facilitating initialization, management and/or transmission stages of MDC or the like.

Memory 210 can be a computer-readable storage medium storing computer-executable instructions and/or information for performing the functions described herein with reference to candidate device 200 (or any component of candidate device 200). For example, memory 210 can store computer-executable instructions that can be executed by processor 212 to select a candidate device for the position of coordinating device, to evaluate transceiver power or other resource of one or more candidate devices and/or for performing initialization, management and/or transmission stages of MDC. Processor 212 can perform one or more of the functions described herein with reference to candidate device 200 (or any component thereof). For example, processor 208 can perform operations for selection and/or maintenance of security, mobility management, capability negotiation, inner-networking, transmission mode operations or the like. Initialization stage component 204, management stage component 206 and transmission stage component 208 will be described in greater detail with reference to FIGS. 3-18.

Figure 3:
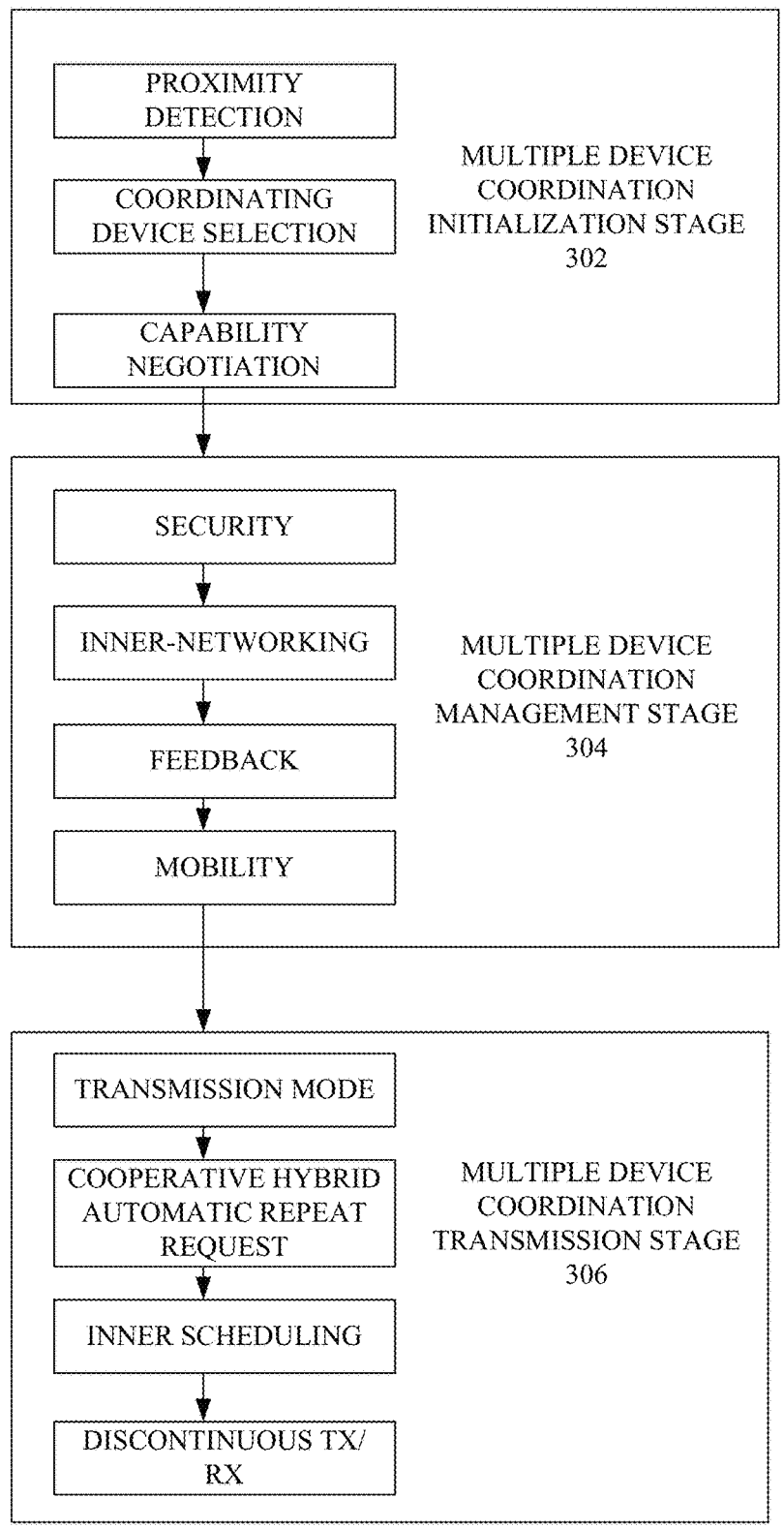
FIG. 3 is a diagram of an exemplary set of functional blocks describing stages of MDC in a wireless communication system in accordance with one or more embodiments of the disclosed subject matter.

Turning first to FIG. 3, shown is a diagram of an exemplary set of functional blocks describing stages of MDC in a wireless communication system in accordance with one or more embodiments of the disclosed subject matter. As shown, initialization stage 302, management stage 304 and/or transmission stage 306 can be employed in MDC for a wireless communication system. In the embodiment shown, the initialization stage 302 is completed, then the management stage 304 is commenced and completed, then the transmission stage is commenced and completed. In some embodiments, candidate device 200 can forego performing one or more of the stages (or substages within the stages). For example, one or more operations may be previously performed and/or information or data may be previously-stored (e.g. like a default configuration or value) and need not be re-performed.

Initialization stage 302 can include one or more operations to facilitate communication coordination between one or more candidate devices. As shown, initialization stage 302 can include proximity detection of one or more candidate devices associated with the same entity, coordinating device selection and/or capability negotiation between the selected coordinating device and one or more non-coordinating devices. The initialization stage 302 will be described in greater detail with reference to initialization stage component 204 of FIG. 4.

Figure 4:
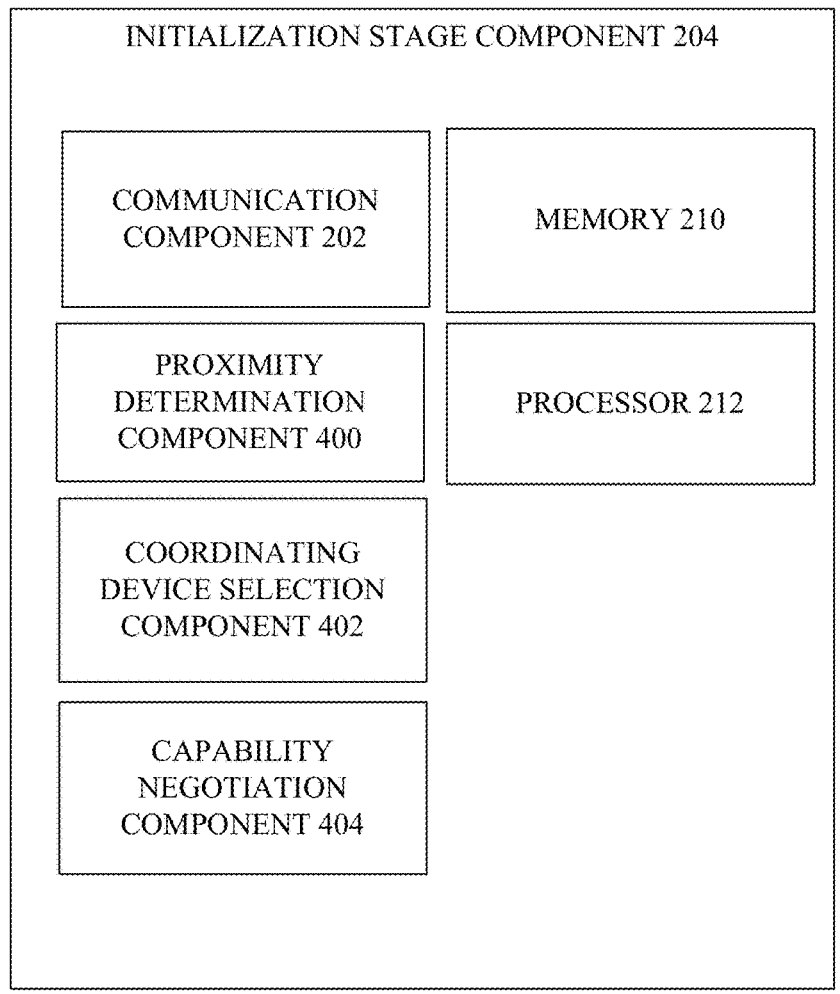
FIG. 4 is an illustration of a block diagram of an exemplary initialization stage component that can facilitate MDC in a wireless communication system in accordance with one or more embodiments of the disclosed subject matter.

FIG. 4 is an illustration of a block diagram of an exemplary initialization stage component that can facilitate MDC in a wireless communication system in accordance with one or more embodiments of the disclosed subject matter. As shown in FIG. 4, initialization stage component 204 can include communication component 202, proximity determination component 300, coordinating device selection component 302, capability negotiation component 304, memory 210 and/or processor 212. In various embodiments, one or more of communication component 202, proximity determination component 300, coordinating device selection component 302, capability negotiation component 304, memory 210 and/or processor 212 can be electrically and/or communicatively coupled to one another to perform one or more functions of initialization stage component 204. Repetitive description of like elements employed in respective embodiments of systems and/or apparatus described herein are omitted for sake of brevity.

With reference to FIGS. 3 and 4, proximity detection of initialization stage 302 can be performed by proximity determination component 400. Proximity determination component 400 can identify whether there are any candidate devices associated with the same entity that are geographically located within a defined distance or a defined signaling coverage relative to candidate device 200. By way of example, but not limitation, proximity determination component 300 can detect proximity of other candidate devices using the BLUETOOTH® protocol and/or radio fingerprinting.

In various embodiments, proximity detection can be performed by one or more of the candidate devices associated with the entity. As such, the candidate device that performs proximity detection can be the same as or different than the candidate device eventually selected as the coordinating device. In this regard, a candidate device can determine proximity to other candidate devices and another other candidate devices can be selected as the coordinating device, in some embodiments. In other embodiments, one or more of the candidate devices performed proximity detection can be the eventual coordinating device for the other candidate devices associated with the entity.

In some embodiments, proximity detection component 400 determines the candidate devices within a defined geographical distance of candidate device 200. In other embodiments, proximity detection component 400 determines the candidate devices within a defined geographical distance of a location determined by candidate device 200 and/or pre-programmed into one or more of the candidate devices 200 or the like.

Coordinating device selection component 302 can select the coordinating device from the set of identified candidate devices associated with the same entity. For example, in some embodiments, coordinating device selection component 302 can select a coordinating device from amongst the candidate devices identified by proximity detection component 400 as being with a defined geographical distance. Coordinating device selection component 302 can select the coordinating device based on one or more of the following criteria: longest battery life among one or more of the candidate devices, most powerful transceiver among one or more of the candidate devices, shortest sum distance between all candidate devices, shortest distance between connecting BS and the one or more candidate devices and/or the candidate device pre-configured to be the coordinating device (e.g., pre-configured by the entity with which the candidate devices are associated).

After coordinating device selection component 402 selects the coordinating device, and during or after initialization stage 302 is completed, the remaining candidate devices (e.g., the non-coordinating devices), can release RRC connections between the non-coordinating devices and the serving BSs for the non-coordinating devices after completion of or during initialization stage 302. In some embodiments, the serving BSs for the non-coordinating devices can remove information (e.g., resource identifier, user equipment (UE) context, public land mobile network (PLMN) setting) for the non-coordinating device. Accordingly, the non-coordinating devices (NCD) will be transparent to the network but will be involved in MDC transmission via the coordinating device. The coordinating device can maintain the RRC connection with the network such that the RRC connection for the non-coordinating devices (and the coordinating device) associated with the same entity is a single connection between the coordinating device for the candidate devices and the network.

Figure 5:
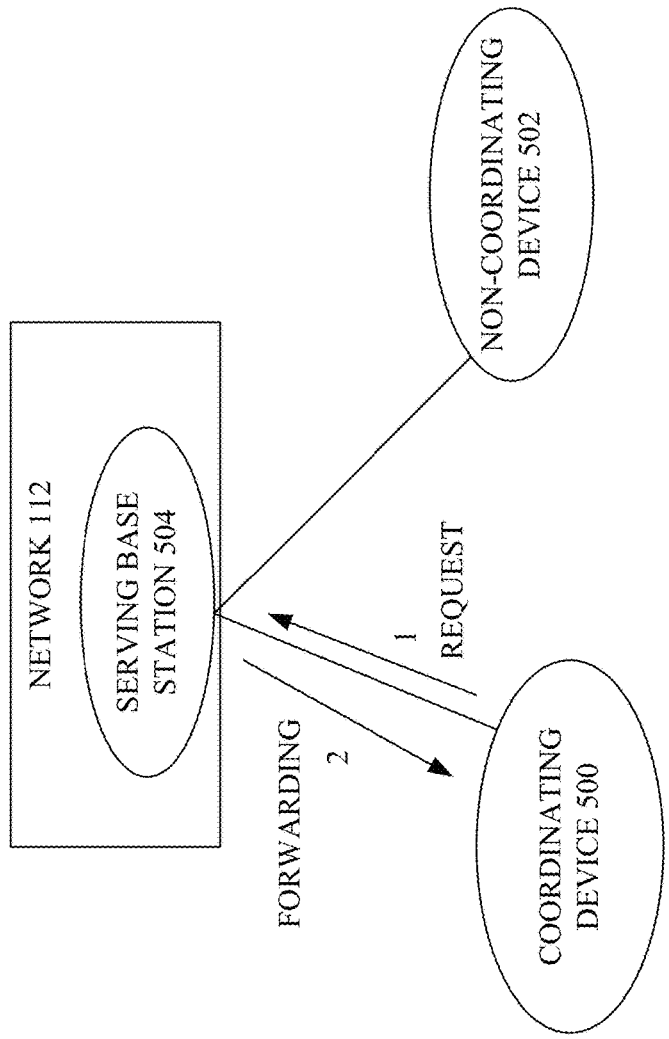
FIGS. 5, 6 and 7 are illustrations of block diagrams of exemplary embodiments of capability negotiation to facilitate the MDC initialization stage performed by initialization stage component of FIG. 4 in accordance with one or more embodiments of the disclosed subject matter.
Figure 6:
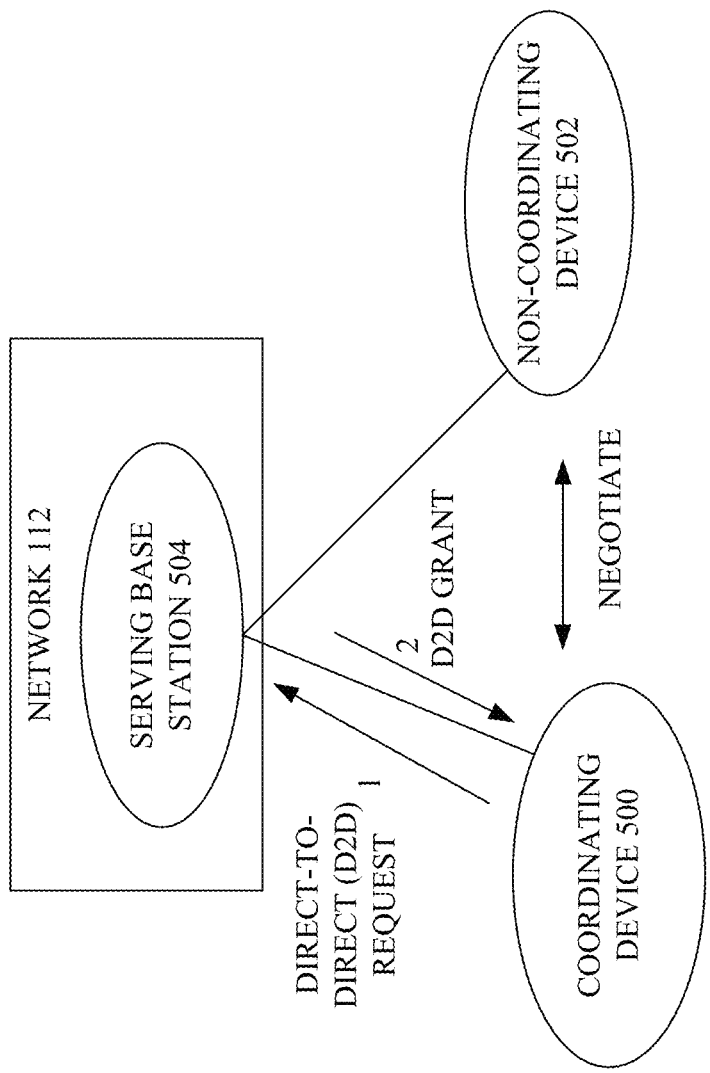
Figure 7:
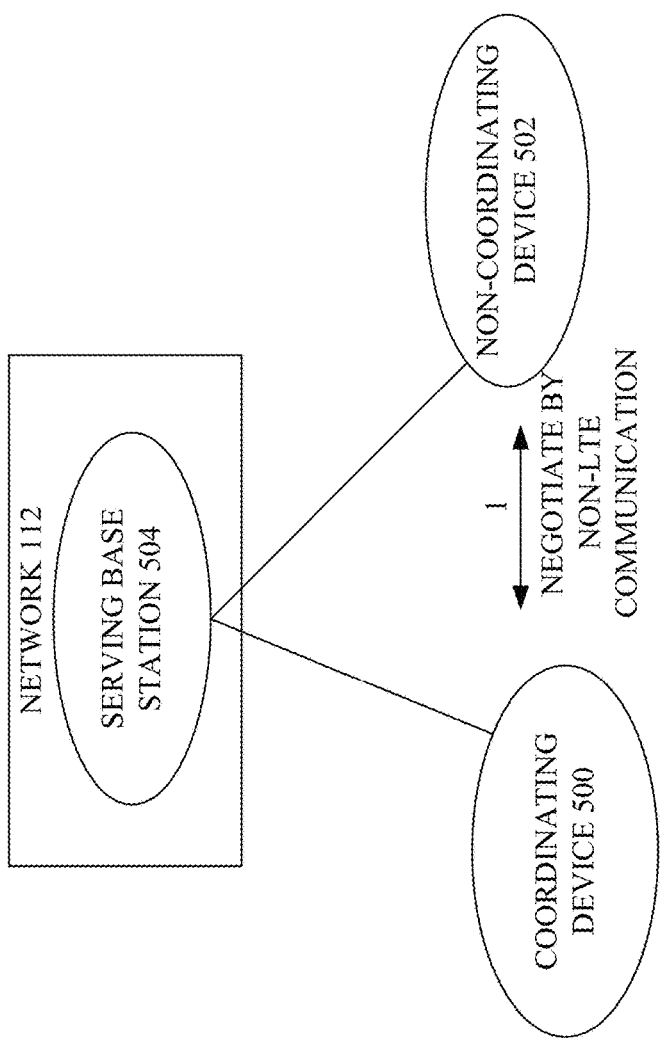

Capability negotiation component 404 can receive capability information forwarded from respective non-coordinating devices. Capability negotiation component 404 can then perform capability negotiation with the non-coordinating devices. FIGS. 5, 6 and 7 are illustrations of block diagrams of exemplary embodiments of capability negotiation to facilitate the MDC initialization stage performed by initialization stage component of FIG. 4 in accordance with one or more embodiments of the disclosed subject matter. Repetitive description of like elements employed in respective embodiments of systems and/or apparatus described herein are omitted for sake of brevity.

Turning first to FIG. 5, in one embodiment, a request for capability information can be transmitted from the coordinating device 500 to serving BS 504. For example, prior to determination that non-coordinating 502 will be a non-coordinating device and a separate RRC connection is no longer needed, non-coordinating device 502 can connect to (or be connected to) the network (e.g., network 112). Serving BS 504 can determine and/or record the capability of non-coordinating device 502 based on the previous RRC setup between non-coordinating device 502 and the network 112 with which serving BS 504 is associated. Upon receiving the request for the capability information, serving BS 504 can forward capability information about the capability and/or resources of non-coordinating device 502 to coordinating device 500.

Turning now to FIG. 6, another embodiment of capability negotiation is shown. In this embodiment, capability information can be forwarded by direct communication between non-coordinating device 502 and coordinating device 500. For example, coordinating device 500 can transmit a request to serving BS 504 to acquire direct-to-direct (D2D) communication with non-coordinating device 502. After the D2D resource is granted by serving BS 504, coordinating device 500 can negotiate capability of non-coordinating device 502 directly with non-coordinating device 502.

Turning now to FIG. 7, another embodiment of capability negotiation is shown. In this embodiment, capability information can be forwarded from non-coordinating device 502 to coordinating device 500 via communication types other than 4G and/or non-long-term evolution (LTE) communication types. By way of example, but not limitation, coordinating device 500 can negotiate with non-coordinating device 502 over a Wi-Fi channel (or other type of non-LTE radio access technology).

After capability is negotiated (or, in some embodiments, during capability negotiation), non-coordinating device 502 can release the RRC connection between non-coordinating device 502 and network 112. As noted above, in some embodiments, if coordinating device 502 has information about capability of non-coordinating device 502 from previous MDC operation, capability negotiation (or one or more aspects of capability negotiation) need not be performed. In some embodiments, the release can be initiated by non-coordinating device 502 sending a release request to network 112 and/or by non-coordinating device 502 prohibiting reception/transmission with network 112 (and thereby being automatically released by serving BS 504 when serving BS 504 determines that a lack of data transmission exists).

Figure 8:
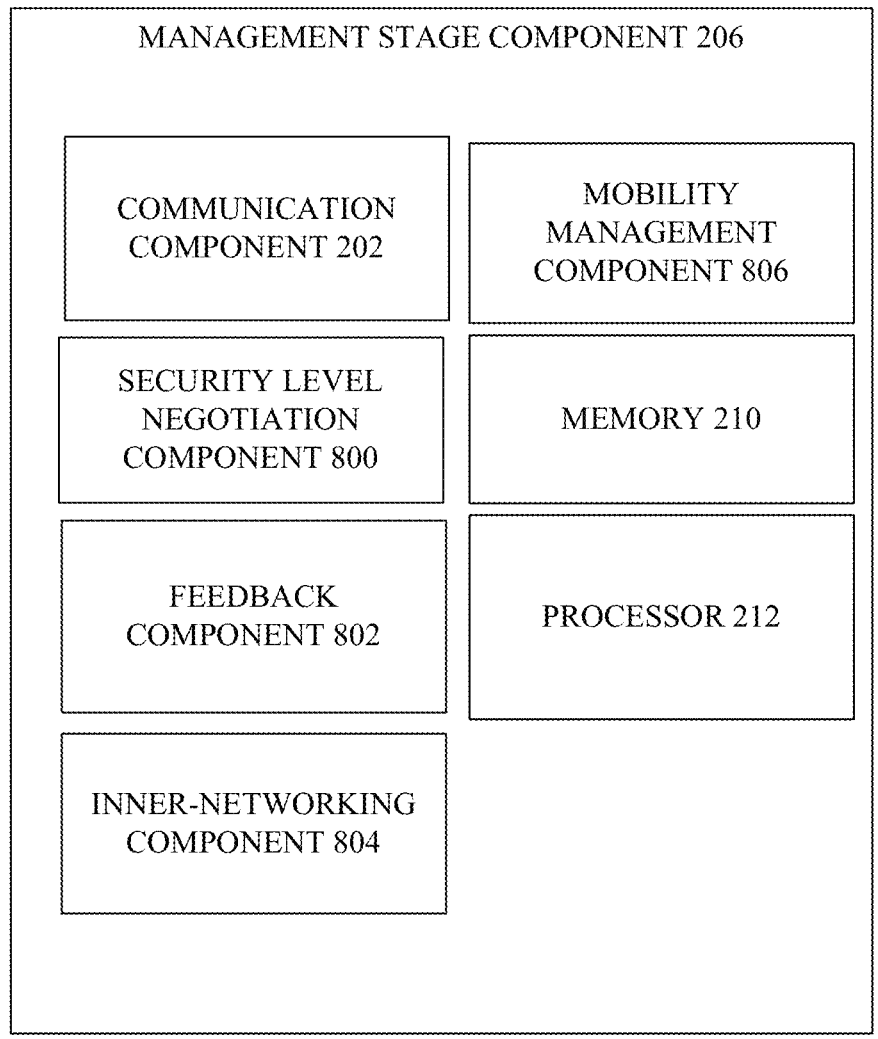
FIG. 8 is an illustration of a block diagram of an exemplary management stage component that can facilitate MDC in a wireless communication system in accordance with one or more embodiments of the disclosed subject matter.

Turning back to FIG. 3, as shown, management stage 304 can follow completion of one or more steps of initialization stage 302 (and/or can be performed stage 304 by management stage component 206 of FIG. 8). In various embodiments, only the coordinating device will perform the functions of management stage 206.

FIG. 8 is an illustration of a block diagram of an exemplary management stage component that can facilitate MDC in a wireless communication system in accordance with one or more embodiments of the disclosed subject matter. As shown in FIG. 8, management stage component 206 can include communication component 202, security level negotiation component 800, feedback component 802, innernetworking component 804, mobility management component 806, memory 210 and/or processor 212. In various embodiments, one or more of communication component 202, security level negotiation component 800, feedback component 802, inner-networking component 804, mobility management component 806, memory 210 and/or processor 212 can be electrically and/or communicatively coupled to one another to perform one or more functions of management stage component 206. Repetitive description of like elements employed in respective embodiments of systems and/or apparatus described herein are omitted for sake of brevity.

Inner-networking component 804 can perform one or more operations before actual data transmission between non-coordinating devices and the network via the coordinating device. Inner-networking component 804 can determine a type of network connection to employ between a non-coordinating device and the coordinating device based on the capability information determined and/or negotiated during initialization stage 302.

Any number of different types of connections can be established. By way of example, but not limitation, a 4G network connection (e.g., LTE network connection) can be established or an LTE D2D network connection can be established.

In some embodiments, if LTE D2D connection is established between a non-coordinating device and the network (via MDC coordinating device operation), inner-networking component 804 need not establish individual D2D connections between the coordinating device and the non-coordinating device. Instead, inner-networking component 804 can determine an amount (or minimum amount) of bandwidth and/or the frequency of communication period to be employed for inner-networking. Inner-networking component 804 can then request the corresponding bandwidth and/or transmission resources from the serving BS for the coordinating device. After the LTE D2D connection is granted, or during grant of the LTE D2D connection, the coordinating device can determine which non-coordinating device can perform direct communication with the coordinating device based on one or more defined rules. The rules can be as described with reference to FIGS. 9, 10 and 11.

Figure 9:
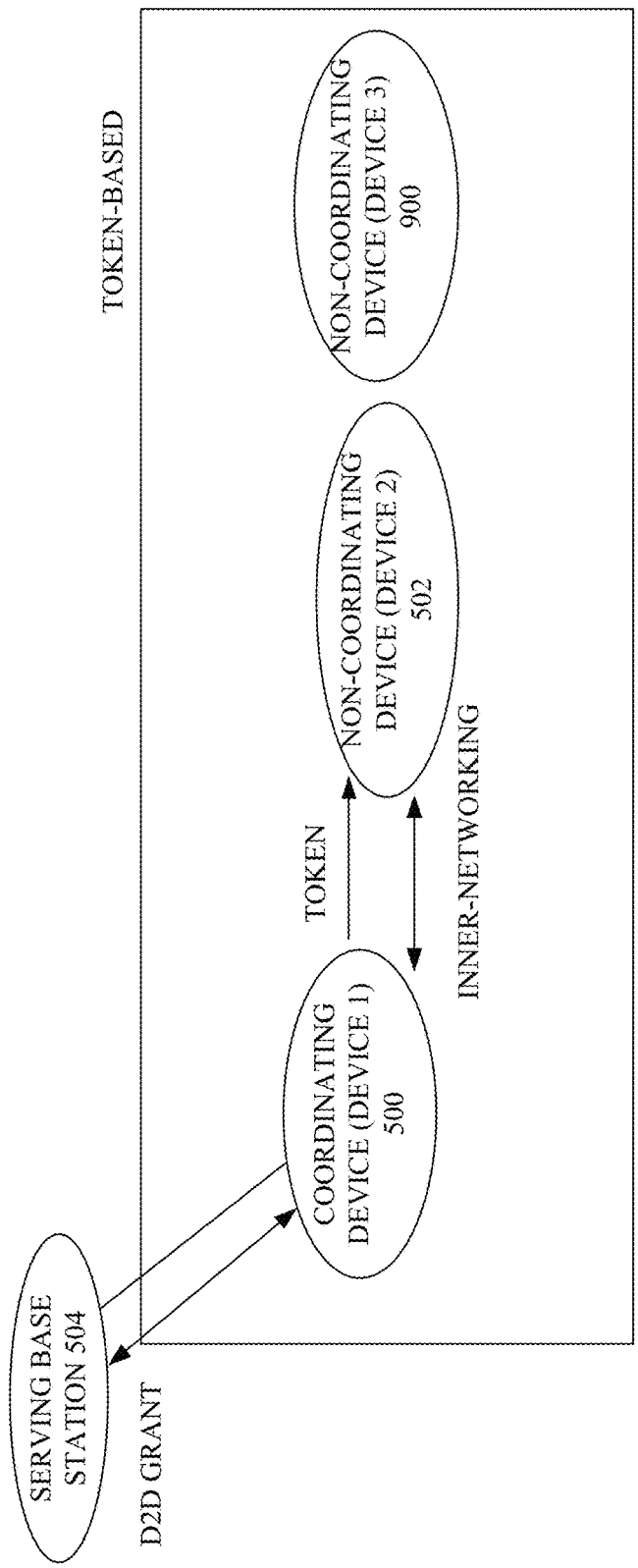
FIGS. 9, 10 and 11 are illustrations of block diagrams of exemplary embodiments of inner-networking approaches to facilitate the MDC management stage performed by management stage component of FIG. 8 in accordance with one or more embodiments of the disclosed subject matter.
Figure 10:
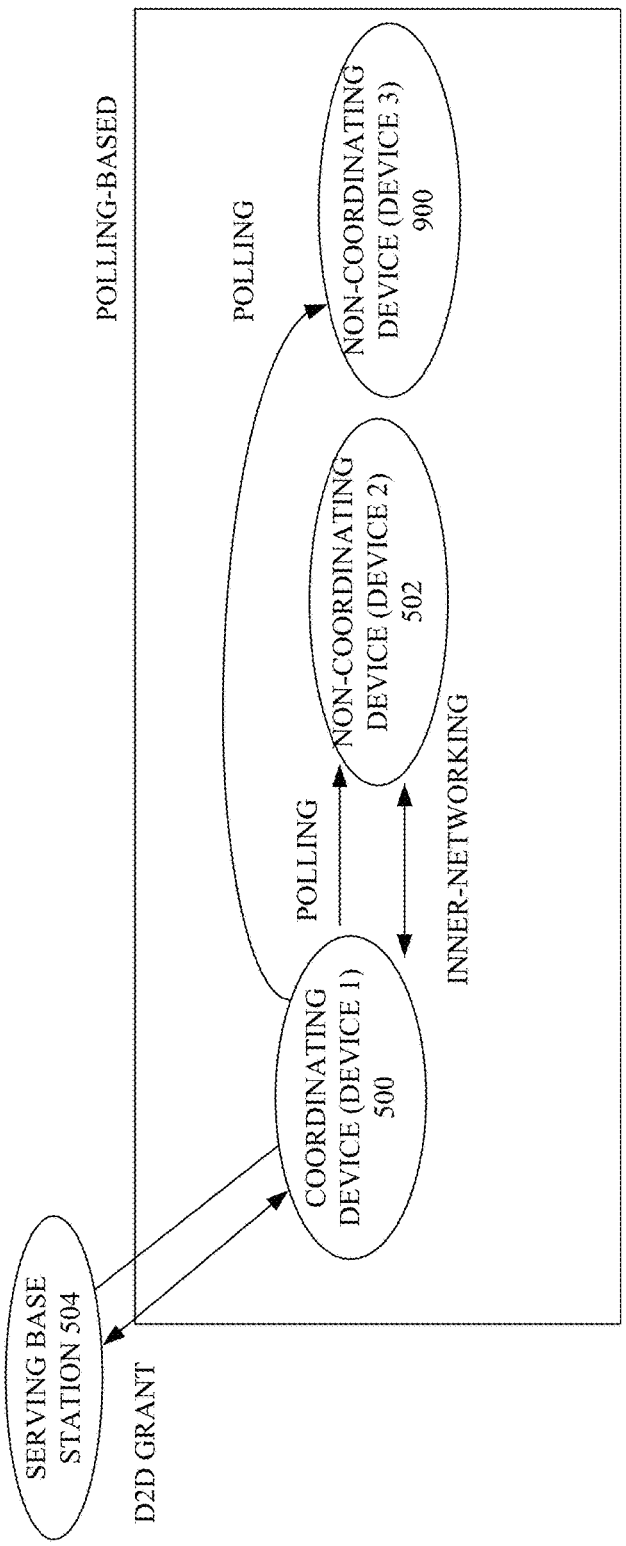
Figure 11:
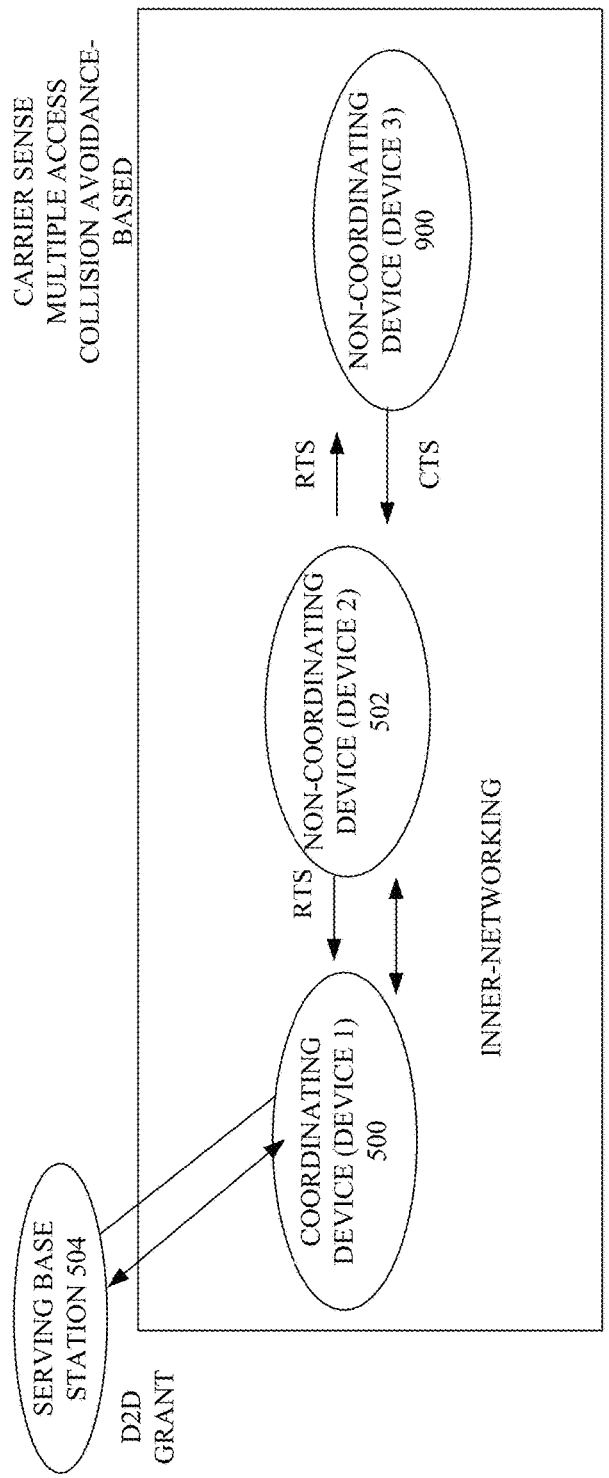

FIGS. 9, 10 and 11 are illustrations of block diagrams of exemplary embodiments of inner-networking approaches to facilitate the MDC management stage performed by management stage component of FIG. 8 in accordance with one or more embodiments of the disclosed subject matter. Repetitive description of like elements employed in respective embodiments of systems and/or apparatus described herein are omitted for sake of brevity.

Turning first to FIG. 9, in some embodiments, as shown, inner-networking component 804 can select a token-based inner-networking approach. In this embodiment, inner-networking component 804 of coordinating device 500 can assign a token to a non-coordinating device (e.g., non-coordinating device 502). The token can be employed (or, in some embodiments, required) to perform inner-networking One or more (or all) non-coordinating devices associated with the same entity as coordinating device 00 can monitor the D2D connection to see whether a token will be granted and/or initiate inner-networking with coordinating device 500 employing the token. When inner-networking is finished, the token can be recycled back to coordinating device 500. In this embodiment, inner-networking is initiated by and/or oriented from coordinating device 500.

Turning now to FIG. 10, inner-networking component 804 can employ a polling-based inner-networking approach. In this embodiment, inner-networking component 804 can periodically reserve at least one inner-networking opportunity for one or more (or all) non-coordinating devices (e.g., non-coordinating devices 502, 900). In some embodiments, a non-coordinating device only monitors the slot associated with the scheduled opportunity, and can thereby reduce power consumption relative to embodiments in which the non-coordinating device monitors all slots (or slots other than that associated with the scheduled opportunity).

Turning now to FIG. 10, inner-networking component 804 can employ a carrier sense multiple access with collision avoidance (CSMA-CA)-based approach to inner-networking. In this embodiment, if non-coordinating device 900, 502 wants to use inner-networking, non-coordinating device 900, 502 can send a request to send (RTS) message and non-coordinating device 900, 502 will be allowed to use a D2D connection when receiving clear to send (CTS) messages. Unlike the previous two approaches described with reference to FIGS. 9 ad 10, this approach supports a non-coordinating device automatically initiating the inner-networking.

In embodiments in which a non-LTE connection is employed for inner-networking, the coordinating device can request a transmission gap with the serving BS. The transmission gap can be the time interval that inner-networking is performed and the coordinating device is unable to receive/transmit any packet with the serving BS. In this embodiment, the serving BS will not schedule any associated packet during the transmission gap.

Turning back to FIG. 8, management stage component 206 can include security level negotiation component 800. Security level negotiation component 800 can facilitate and/or determine security for communication between the network and one or more of the non-coordinating devices (via coordinating device operating according to MDC embodiments described herein). In various embodiments, for example, security level negotiation component 800 can exchange a traffic encryption key (TEK) and/or algorithmic encryption key (AEK) with the network. When a new key is updated, security level negotiation component 800 can transmit one or more of the keys to one or more of the non-coordinating devices to facilitate decoding of packets from the network by the non-coordinating devices.

In some embodiments, the security algorithm employed during inner-networking can differ from the adopted security algorithm in the network. Also, in some embodiments, an update of a security key used during inner-networking can be performed and/or, in some embodiments, required.

Management stage component 206 can also include mobility management component 806. Mobility management component 806 can perform one or more functions to facilitate a non-coordinating device moving from one network to another network. In various embodiments, mobility management component 806 can perform mobility management for the devices in the MDC system since the devices will typically have similar channel quality and/or identical moving trajectory.

Figure 12:
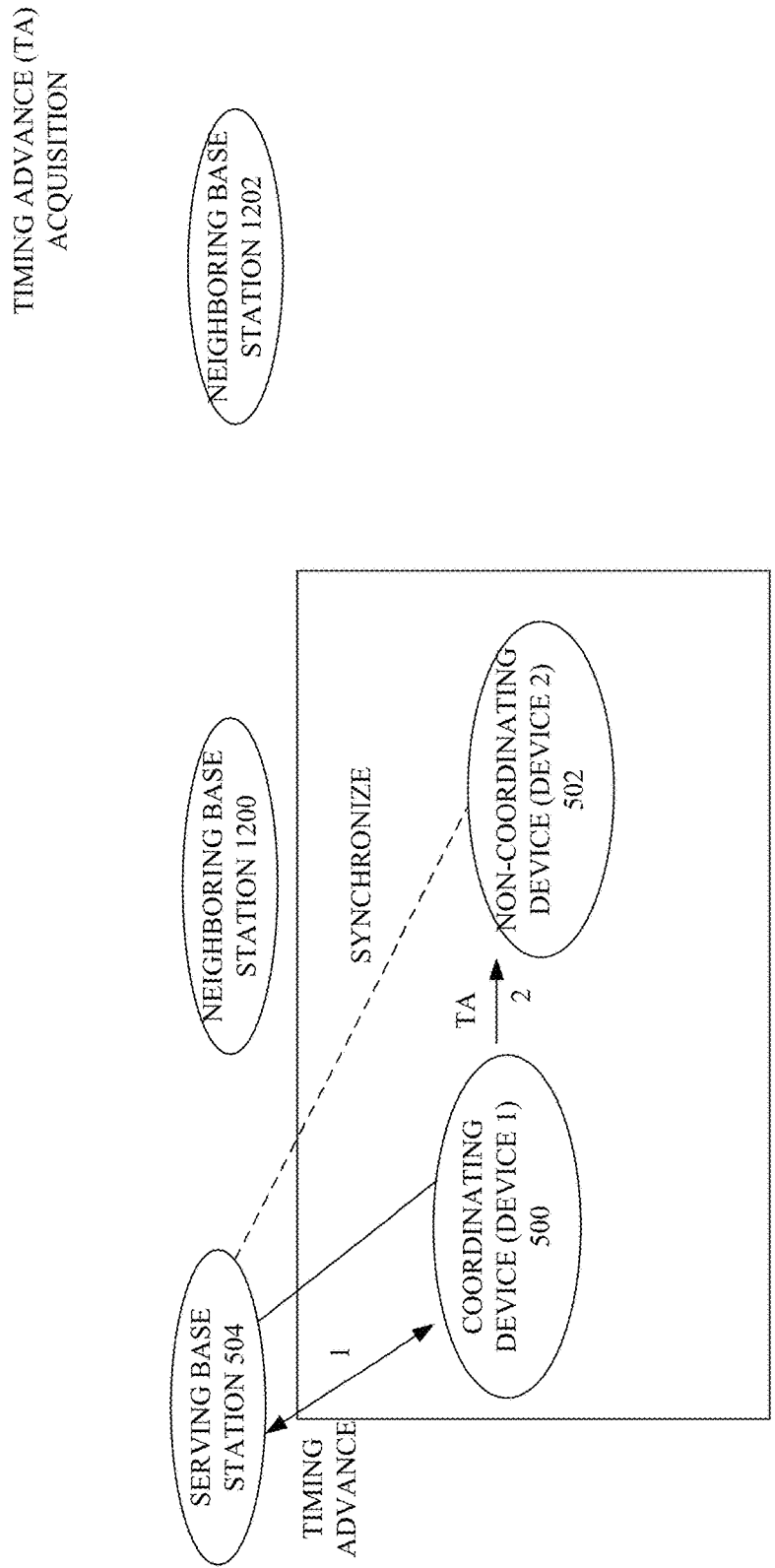
FIGS. 12, 13 and 14 are illustrations of block diagrams of exemplary embodiments of mobility management steps to facilitate the MDC management stage performed by management stage component of FIG. 8 in accordance with one or more embodiments of the disclosed subject matter.
Figure 13:
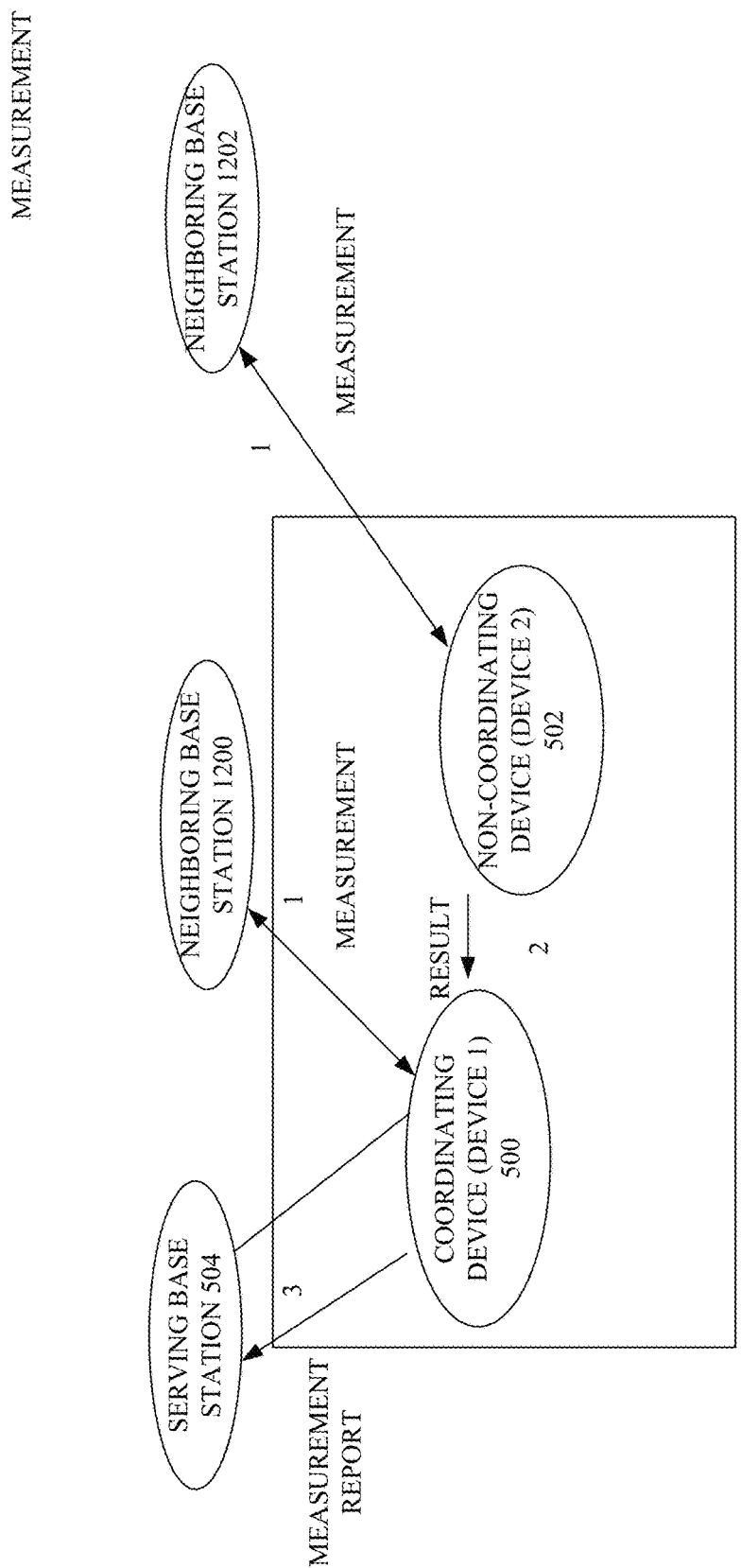
Figure 14:
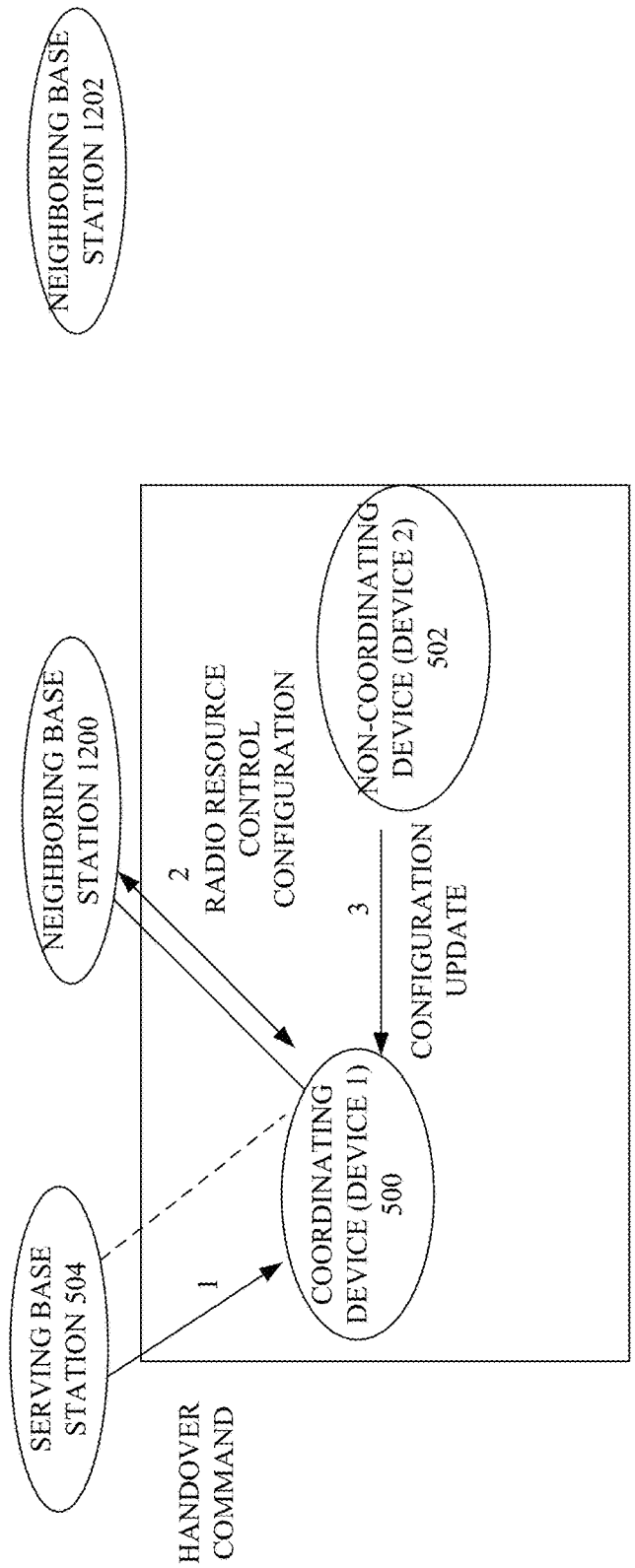

FIGS. 12, 13 and 14 are illustrations of block diagrams of exemplary embodiments of mobility management steps to facilitate the MDC management stage performed by management stage component of FIG. 8 in accordance with one or more embodiments of the disclosed subject matter. Repetitive description of like elements employed in respective embodiments of systems and/or apparatus described herein are omitted for sake of brevity.

Turning first to FIG. 12, in the embodiment shown, mobility management component 806 can first perform timing advance (TA) acquisition to maintain the uplink by synchronization with a serving BS. For example, mobility management component 806 can perform a random access procedure whereby coordinating device 500 sends a preamble to serving BS 504 and waits for a response to the TA value. When the TA value is acquired, coordinating device 500 can forward the TA value for non-coordinating device 502 to non-coordinating device 502. Accordingly, in this embodiment, coordinating device 500 can reuse the TA value to maintain the uplink synchronization with serving BS 504 as well. When the entity to which coordinating device 500 and non-coordinating device 502 are associated moves, coordinating device 500 can perform measurement and/or employ handover processes as described with reference to FIGS. 13 and 14 to change the serving BS for coordinating device 500 (and, by extension, for non-coordinating devices for which coordinating device 500 provides MDC).

Turning to FIG. 13, mobility management component 806 can perform measurement-based action to collect information from neighboring BSs (e.g., neighboring BS 1200) to make a target BS selection (or provide information that can be employed to make a target BS selection). During measurement, mobility management component 806 can measure the reference signal received power (RSRP)/reference signal received quality (RSRQ) of a neighboring cell. In one embodiment, the measurement can be made by coordinating device 500 or, in another embodiment, coordinating device 500 can request that non-coordinating device 502 measure the indicated cell. If coordinating device 500 requests that non-coordinating device 502 measure the indicated cell, the measurement process can be performed more quickly than the measurement process if coordinating device 500 performs the measurement directly since a parallel measurement (e.g., inter-frequency measurement) can be achieved by multiple devices with multiple antennas. The result measured from non-coordinating device 502 can be reported to coordinating device 500. When measurement results are collected, coordinating device 500 can report the information to serving BS 504 and await a handover decision.

Turning to FIG. 14, mobility management component 806 can also perform handover-based action to break the connection with original serving BS (e.g., serving BS 504) and switch to a target BS (e.g., neighboring BS 1200). If handover is initiated, mobility management component 806 can attempt synchronization with the target BS (e.g., neighboring BS 1200) and obtain an RRC configuration for the target BS. When configuration is completed, coordinating device 500 can transmit the system information to non-coordinating device 502. For example, when a new Cell Radio Network Temporary Identifier (C-RNTI) is assigned, coordinating device 500 can transmit the C-RNTI to non-coordinating device 502 for facilitating transmission with the target BS.

Turning back to FIG. 8, feedback component 802 can facilitate the management stage of MDC as well. For example, in a legacy LTE network, the coordinating device can provide device transmission information as feedback to facilitate the decision of the BS. Transmission information can include, but is not limited to, channel quality identifier (CQI) information, acknowledge information, non-acknowledge (A/N) information and/or scheduling request (SR) information. To provide the feedback information, the BS can configure corresponding radio resources in Physical Uplink Control Channel (PUCCH) or Physical Uplink Shared Channel (PUSCH) and consequently, the device can feedback the information based on the specified timing or event.

Feedback component 802 can provide CQI feedback with the value measured by the coordinating device (e.g., via legacy operations, in some embodiments) due to channel quality of coordinating devices and non-coordinating devices for the same entity typically being similar to one another. Non-coordinating devices can forego the feedback even if the non-coordinating devices have transmissions.

Feedback component 802 can provide A/N feedback. However, the coordinating device can provide the following acknowledgement responses based on determinations regarding whether the transmission is correctly decoded. In one embodiment, a Reply Acknowledge message can be sent by the coordinating device when the coordinating device decodes a correct packet through its baseband. In another embodiment, a Reply Acknowledge message can be sent when one of the devices (one or more of the coordinating device or the non-coordinating device) decodes a correct packet (the non-coordinating devices can forward the correct packet to coordinating device).

In another embodiment, a Reply Acknowledge message can be sent when the coordinating device employs cooperative hybrid automatic repeat request (HARQ) and obtains a correct packet after cooperation. The cooperative HARQ means a soft combining is used by the coordinating device and/or non-coordinating device (the non-coordinating device can selectively forward the receiving packet to the coordinating device and the coordinating device can decode the packets in a combining approach). In various embodiments, the combining approach can be a chase combining approach or an incremental redundancy approach.

In another embodiment, a Reply Acknowledge message can be sent when every device decodes a correct packet on its baseband. The coordinating device can have the capability to decide which kind of the deciding algorithm is applied. The selection of the algorithm can depend on the transmission mode adopted by the MDC and/or the robustness desired for the running applications. While the coordinating device can determine which deciding algorithm is appropriate, the coordinating device can request the non-coordinating device provide one or more corresponding operations (e.g., forward A/N based on the receiving or forward received packet for further cooperation).

In some embodiments, feedback component 802 can feed back an SR. For example, in some embodiments, feedback component 802 can aggregate one or more (or the entire set of) scheduling requests from one or more non-coordinating devices and/or send the aggregated requests to the serving BS. In some embodiments, feedback component 802 can set a timer and aggregate the requests received before timer expiration. The timer can re-set when the coordinating device makes a SR to the BS. During aggregation, feedback component 802 can calculate the total required bandwidth and/or determine or categorize the quality of service (QoS) of aggregated data. Alternatively, feedback component 802 can send a SR immediately without aggregation if the packet from any device is non-delay tolerant.

Figure 15:
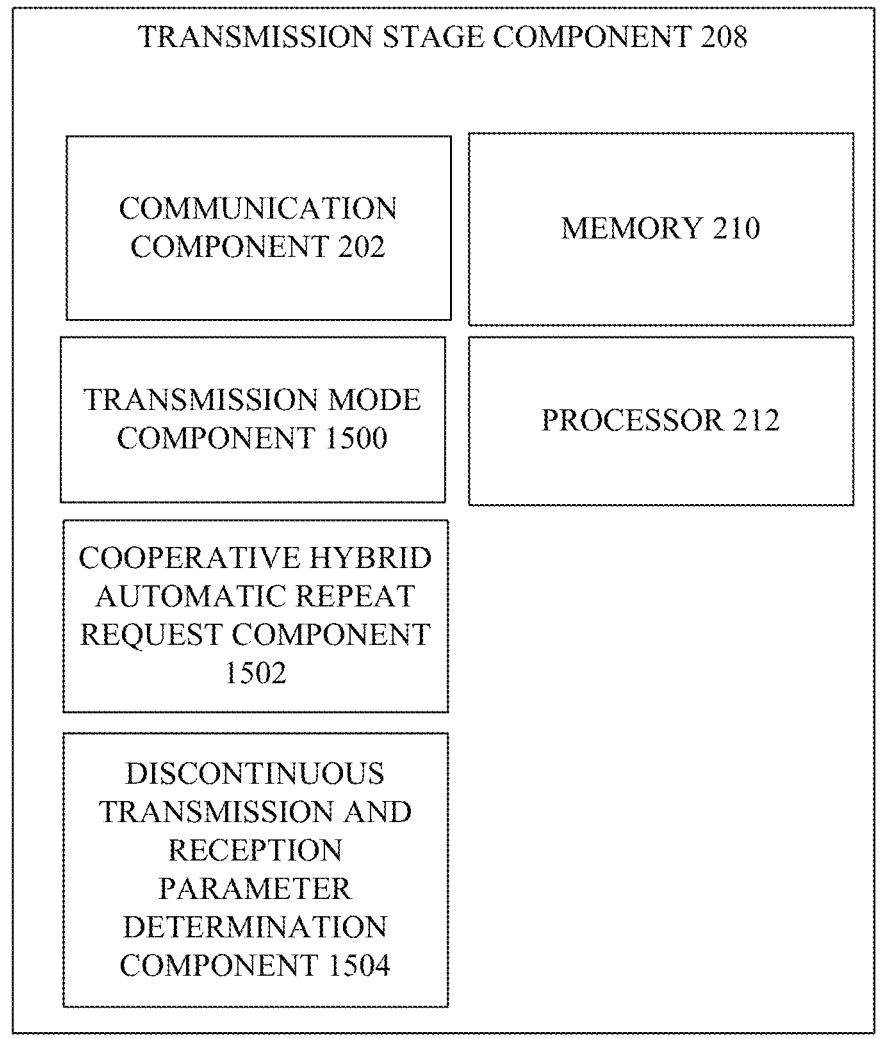
FIG. 15 is an illustration of a block diagram of an exemplary transmission stage component that can facilitate MDC in a wireless communication system in accordance with one or more embodiments of the disclosed subject matter.

Turning back to FIG. 3, as shown, transmission stage component 306 can be performed after management stage 304, and can be performed by transmission stage component 208. FIG. 15 is an illustration of a block diagram of an exemplary transmission stage component that can facilitate MDC in a wireless communication system in accordance with one or more embodiments of the disclosed subject matter.

Transmission stage component 208 can include communication component 202, transmission mode component 1500, cooperative HARQ component 1502, discontinuous transmission and reception parameter determination component 1504, memory 210 and/or processor 212. In various embodiments, one or more of communication component 202, transmission mode component 1500, cooperative HARQ component 1502, discontinuous transmission and reception parameter determination component 1504, memory 210 and/or processor 212 can be electrically and/or communicatively coupled to one or more of communication component 202, transmission mode component 1500, cooperative HARQ component 1502, discontinuous transmission and reception parameter determination component 1504, memory 210 and/or processor 212 to perform the functions of transmission stage component 208. Repetitive description of like elements employed in respective embodiments of systems and/or apparatus described herein are omitted for sake of brevity.

During (or as a result of) transmission stage 306, traffic flow (e.g., routing) can be distributed among one or more devices served by the MDC and/or decisions can be made regarding how to process downlink and/or uplink transmission. In various embodiments, transmission stage 306 can provide satisfactory or desirable traffic offloading for avoiding or reducing the likelihood of traffic congestion and/or bottleneck in any device in MDC and/or support fast adaption on the transmission to take advantage of available resources. In some embodiments, transmission stage 306 can include scheduling discontinuous transmission to allow a device to turn off the device transceiver at specific times (or timing) for power savings.

As shown, transmission stage component 208 can include transmission mode component 1500. In some embodiments, when MDC is enabled, transmission mode component 1500 can enable activation of one or more antennas. Transmission mode component 1500 can select one or more of the activated antennas to handle corresponding transmissions separately or jointly. With the flexible usage of one or more different antennas, the MDC system can provide desirable transmission efficiency or robustness. Depending on the use of the one or more antennas, transmission mode component 1500 can provide at least four different transmission modes for data transmission.

Figure 16:
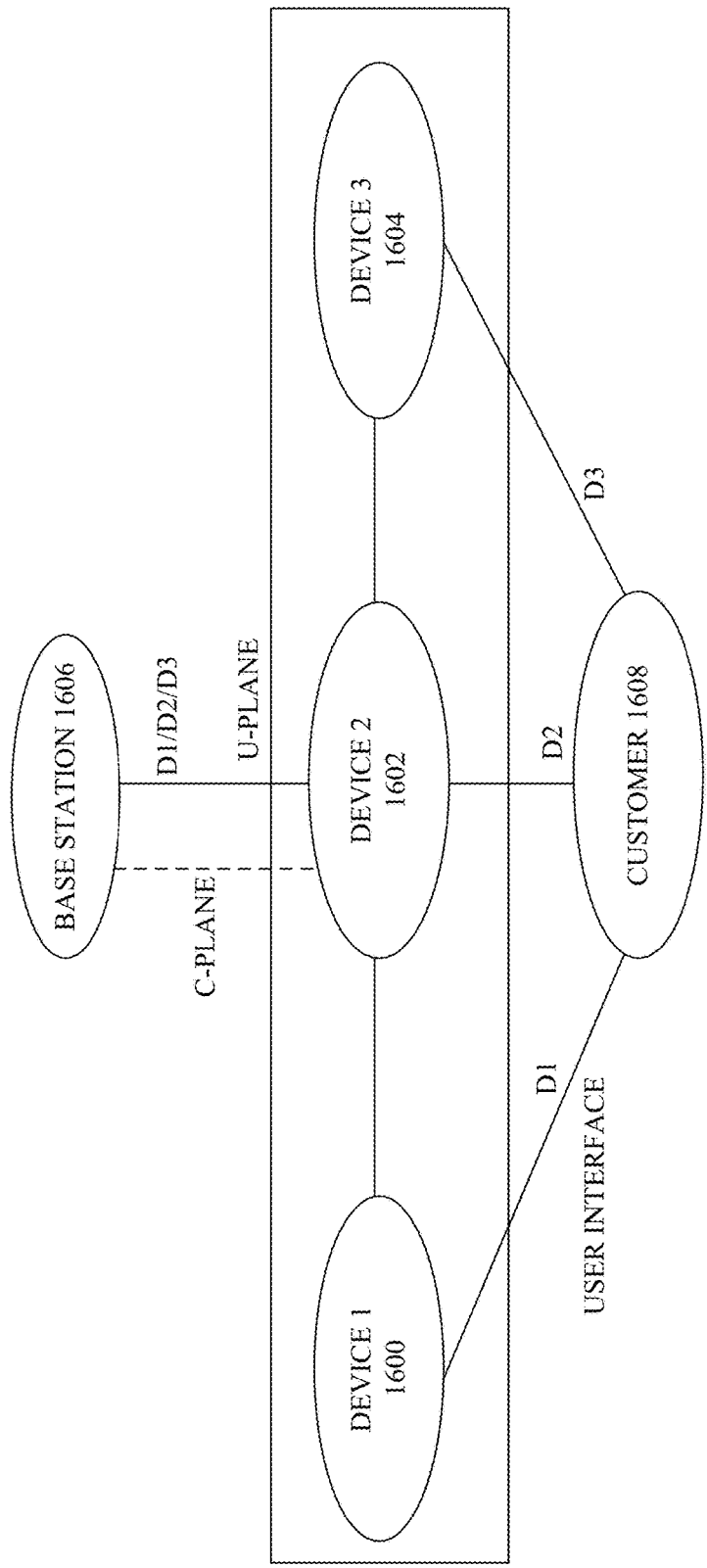
FIGS. 16, 17 and 18 are illustrations of block diagrams of exemplary embodiments of transmission modes to facilitate the MDC transmission stage performed by transmission stage component of FIG. 15 in accordance with one or more embodiments of the disclosed subject matter.
Figure 17:
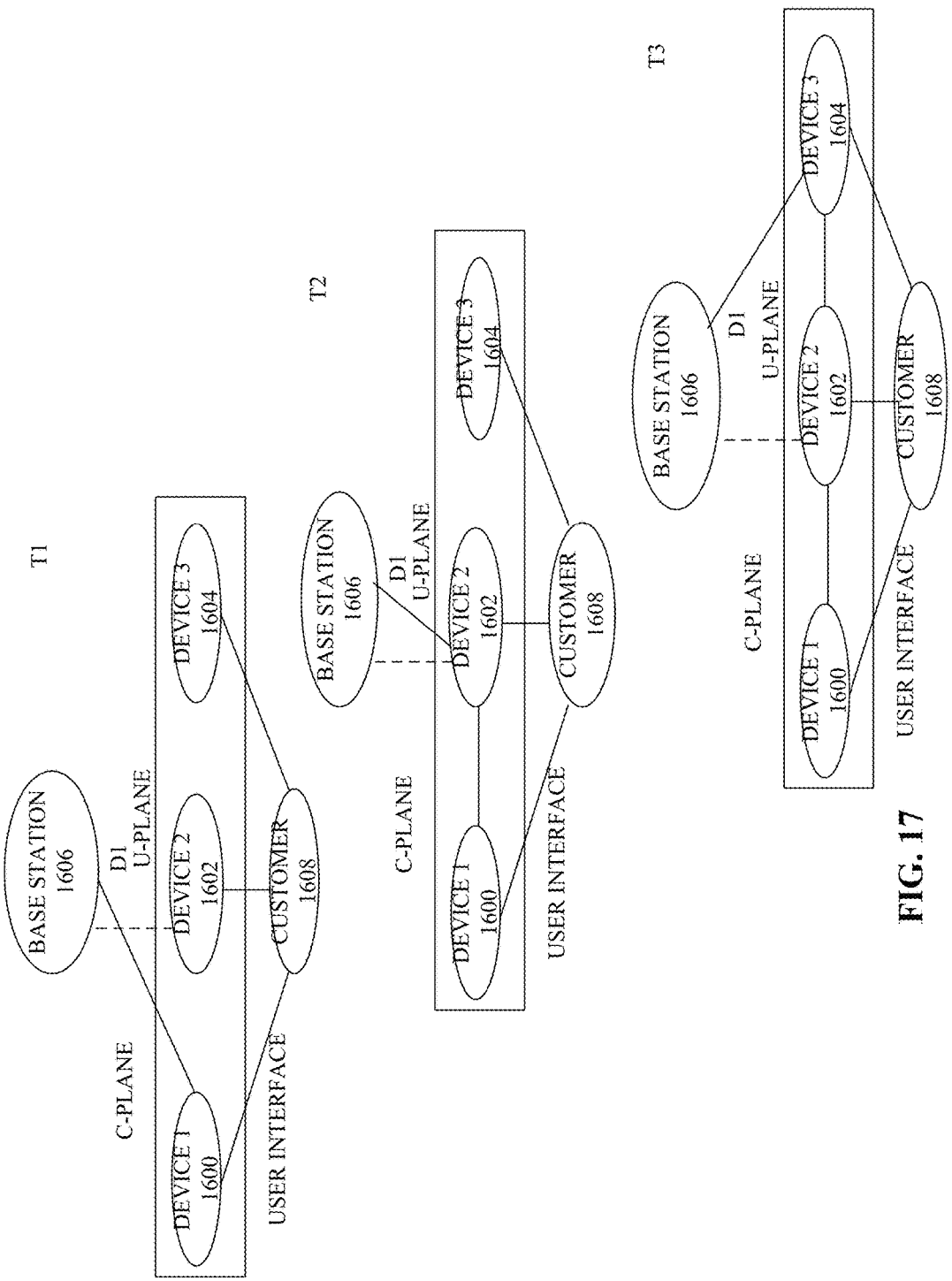
Figure 18:
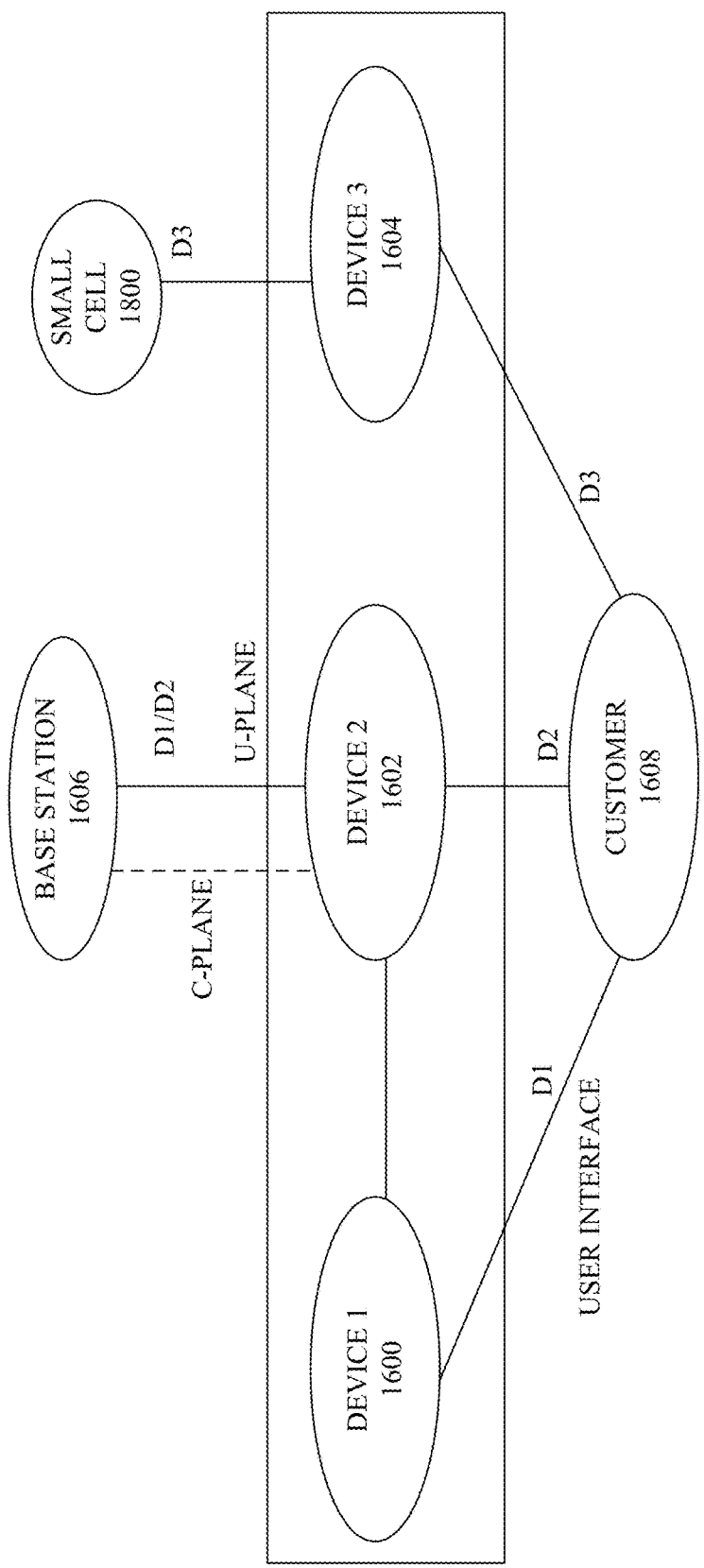

FIGS. 16, 17 and 18 are illustrations of block diagrams of exemplary embodiments of transmission modes to facilitate the MDC transmission stage performed by transmission stage component of FIG. 15 in accordance with one or more embodiments of the disclosed subject matter. For example, FIG. 16 is an illustration of a block diagram of an exemplary embodiment of the first transmission mode. In the first transmission mode, one or more (or all) devices (e.g., device 1 1600, device 2 1602, device 3 1604) and coordinating device associated with an entity are connected to a BS and the devices can transmit/receive packets sequentially. Accordingly, one or more of the non-coordinating devices, for example, can transmit/receive identical packets simultaneously, or concurrently, through identical radio resources (e.g., time and/or frequency resources). Space diversity can be acquired in this transmission mode and robust transmission can result. The coordinating device can determine which traffic flow (associated with what particular non-coordinating device) is suitable by using this transmission mode and scheduling the transmission sequences.

As shown in FIG. 16, serving BS can schedule the transmission of data (e.g., D1/D2/D3) to device 1 1600, device 2 1602 and device 3 1604 at corresponding resources to the coordinating device. The coordinating device can make an SR for the data for which the destination for data D1 is device 1, for which the destination for data D2 is device 2 and/or for which the destination for data D3 is device 3 or the coordinating device could piggyback the scheduling request at its PDU for data D2 and D3.

One or more (or all) devices 1600, 1602, 1604 can attempt to monitor the PDCCH and receive data D1/D2/D3 at the same resource simultaneously, or concurrently. In some embodiments, the device receiving the data can relay the data to the intended destination device.

Turning back to FIG. 15, cooperative HARQ component 1502 can perform a relaying. For example, when the destination device correctly decodes a packet, the destination device can send the packet into the buffer for the destination device and/or show the content on the user interface for the destination device. As compared with non-MDC systems, there can be transmission latency in this transmission mode (e.g., D3 may be delayed after D1 and/or D2). The coordinating device can decide the transmitted packet order in this mode to prevent, or reduce the likelihood of, a quality of service (QoS) violation.

In another embodiment, transmission mode component 1500 can implement transmission mode 2. In transmission mode 2, one or more (or all) non-coordinating devices in the MDC system can be connected to a BS and the devices can transmit/receive packets sequentially. The transmission content can be identical or different dependent on the application. In some embodiments, time diversity can be achieved in this mode if the packet content is identical (e.g., a similar packet being repeatedly transmitted but received by different devices).

For example, FIG. 17 is an illustration of a block diagram of an exemplary embodiment of the second transmission mode. As shown, packet D1 is repeated three times at T1, T2 and T3 and different non-coordinating devices receive the packet. Cooperative HARQ component 502 can be applied in this transmission mode and/or device 1 1600 can finish overall decoding after T3 and output the D1 packet if the packet was successful decoded. The coordinating device is configured to notify the serving BS to send the identical content at three respective TTI.

Devices that do not need to transmit/receive at a specific time lot (e.g. device 2 1602 and device 3 1604 in T1) can turn off transceiver power and/or they can perform inner-networking if the coordinating device does not transmit data to/from the BS. Transmission stage component 208 can make the determination regarding inner-networking as described below.

Turning now to FIG. 18, shown is an illustration of a block diagram of an exemplary embodiment of the third transmission mode. As shown, the coordinating device can establish dual-connectivity in which one connection is with BS 1606 and the other connection is with small cell 1800. Afterwards, the coordinating device can categorize the devices to communicate with BS 1606 and small cell 1800 independently. In transmission mode 3, parallel transmission with different or identical content can be enabled.

Transmission mode component 1500 can also enable a fourth transmission mode (not shown). The fourth transmission mode can be a combination of the second and third transmission modes in which dual connectivity is established but the transmission is not parallel.

Cooperative HARQ component 1502 can be activated when more than one non-coordinating device is attempting to receive identical packets from the BS. For example, the devices that are not destination devices can behave as a relay to forward the corresponding packet. In various embodiments, cooperative HARQ component 1502 can provide cooperative relaying by amplify-and-forward relaying and/or by decode-and-forward relaying. In addition, the relaying can be selective whereby the destination device can try to decode the packet by itself and, if decoding fails, further request the relaying for the retransmission. Employing cooperative HARQ component 1502, retransmission can be performed by the BS or the relay (other devices). Hence, more choices of retransmission source and/or opportunity can be created and thereby improve the transmission quality.

Inner-scheduling can be performed by transmission mode component 1500. For example, when different transmission modes are used in MDC, different performance can result. For example, transmission mode 1 can result in transmission latency but provide robust transmission while transmission mode 3 will create high capacity with high power consumption. The coordinating device can consider the QoS requirements of running applications and decide which mode is ideal or suitable.

With inner-scheduling, when transmission mode is determined, the coordinating device can determine packet transmission order associated with different devices/applications and send corresponding scheduling requests. If cooperative HARQ is supported, the coordinating device can also schedule the opportunity for using inner-networking to relay the packets between the destination device and a device that is not the destination device (e.g., providing retransmission).

Discontinuous transmission and reception parameter determination component 1504 can determine a parameter to associate with one of the one or more non-coordinating devices for discontinuous transmission and reception operation. In some embodiments, the parameter being associated with the one of the one or more non-coordinating devices for discontinuous transmission and reception operation includes a discontinuous reception parameter configured by a serving BS.

In conventional LTE networks, a device can turn off power even when the RRC connection is maintained. This is because the BS can configure a DRX cycle with related parameters to let the device know when there is an active period for the device to receive its belonged packet and the device can discontinue monitoring after the active period. Since only the coordinating device maintains the RRC connection with the serving BS in these embodiments, discontinuous transmission and reception parameter determination component 1504 would typically configure one DRX parameter set for the entire set of non-coordinating devices and coordinating device associated with the entity. However, it is not necessary to apply the parameter setting for all devices. Instead, discontinuous transmission and reception parameter determination component 1504 can further decide the corresponding DRX parameter for one or more (or each) of the non-coordinating devices.

Figure 19:
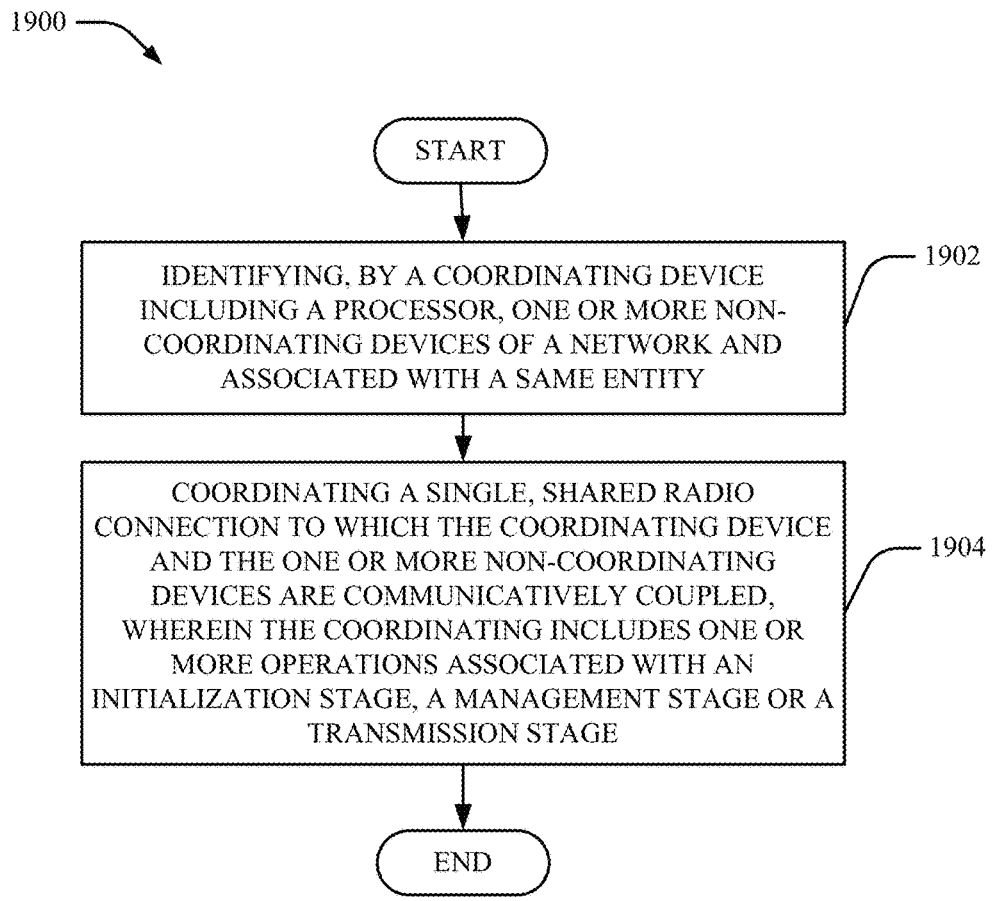
FIGS. 19, 20, 21, 22, 23 and 24 are flowcharts of exemplary methods to facilitate MDC in a wireless communication system in accordance with one or more embodiments of the disclosed subject matter.

FIGS. 19, 20, 21, 22, 23 and 24 are flowcharts of exemplary methods to facilitate MDC in a wireless communication system in accordance with one or more embodiments of the disclosed subject matter. Turning first to FIG. 19, at 1902, method 1900 can include identifying, by a coordinating device including a processor, one or more non-coordinating devices of a network and associated with the same entity. In one or more embodiments, coordinating includes one or more operations associated with: an initialization stage, a management stage or a transmission stage.

At 1904, method 1900 can include coordinating a single, shared radio connection to which the coordinating device and the one or more non-coordinating devices are communicatively coupled, wherein the coordinating includes one or more operations associated with an initialization stage, a management stage or a transmission stage.

Figure 20:
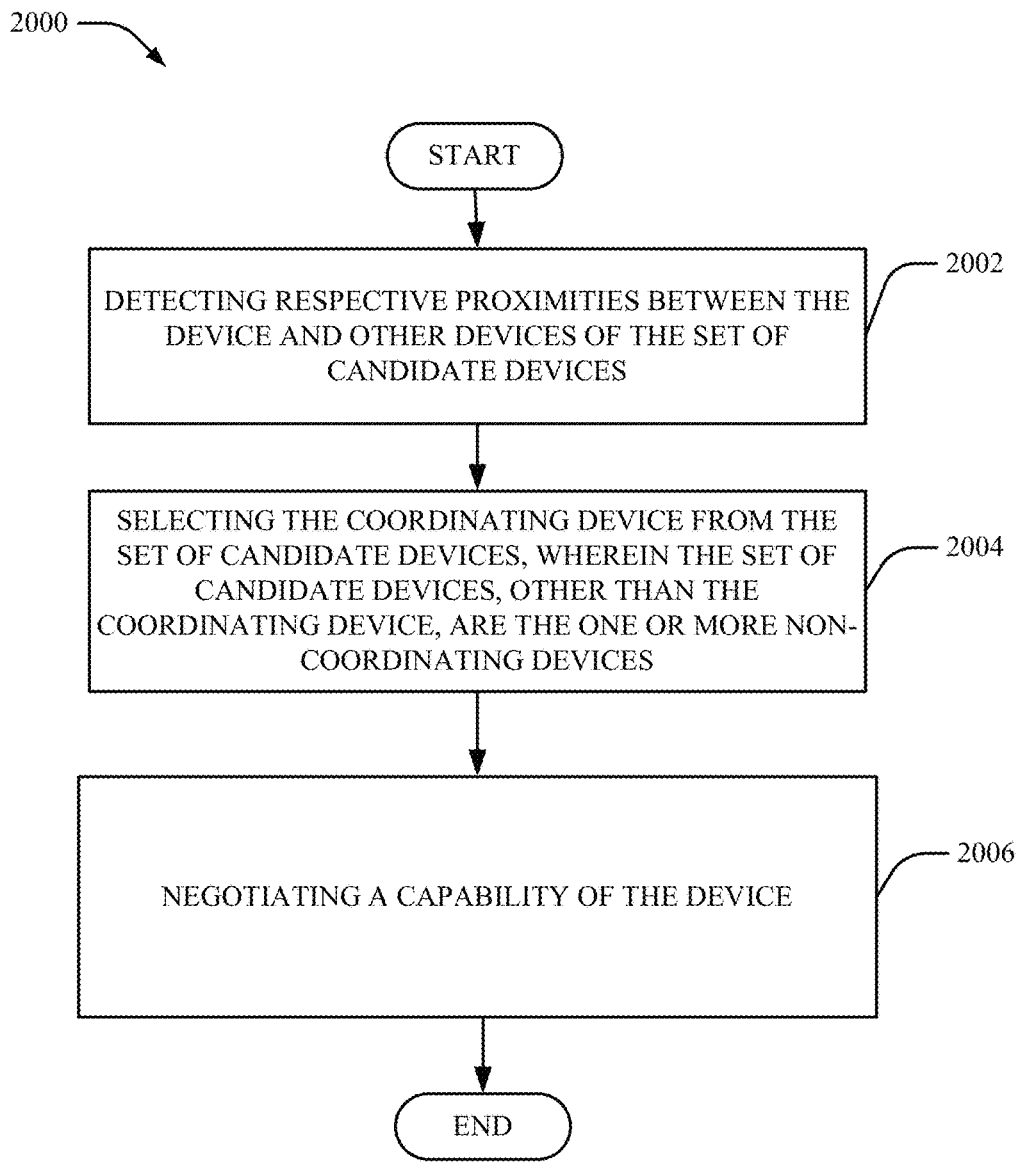

Turning now to FIG. 20, method 2000 includes a number of steps associated with an initialization stage for a device of a set of candidate devices. At 2002, method 2000 can include detecting respective proximities between the device and other devices of the set of candidate devices. The coordinating device and the one or more non-coordinating devices can make up a set of candidate devices.

At 2004, method 2000 can include selecting the coordinating device from the set of candidate devices, wherein the set of candidate devices, other than the coordinating device, are the one or more non-coordinating devices. In some embodiments, selecting is based on at least one of respective battery lives of the set of candidate devices, respective powers of transceivers of the set of candidate devices, a shortest distance between the set of candidate devices, a shortest distance between a base station to which the set of candidate devices is communicatively coupled, respective screen sizes associated with the set of candidate devices or respective entity configurations of the set of candidate devices.

At 2006, method 2000 can include negotiating a capability of the device. In some embodiments, negotiating the capability of the device includes transmitting a request message to a BS device associated with the device. The device can be one of the one or more non-coordinating devices. Negotiating can also include receiving, by the coordinating device, information indicative of the capability of the device based on the transmitting the request message. For example, the coordinating device can negotiate respective capabilities of one or more non-coordinating devices.

In some embodiments, the coordinating device can transmit a request message to a BS device to acquire direct-to-direct communication, and determine that a resource associated with the direct-to-direct communication has been granted. The negotiation can be performed after determining that the resource associated with the direct-to-direct communication has been granted.

Figure 21:
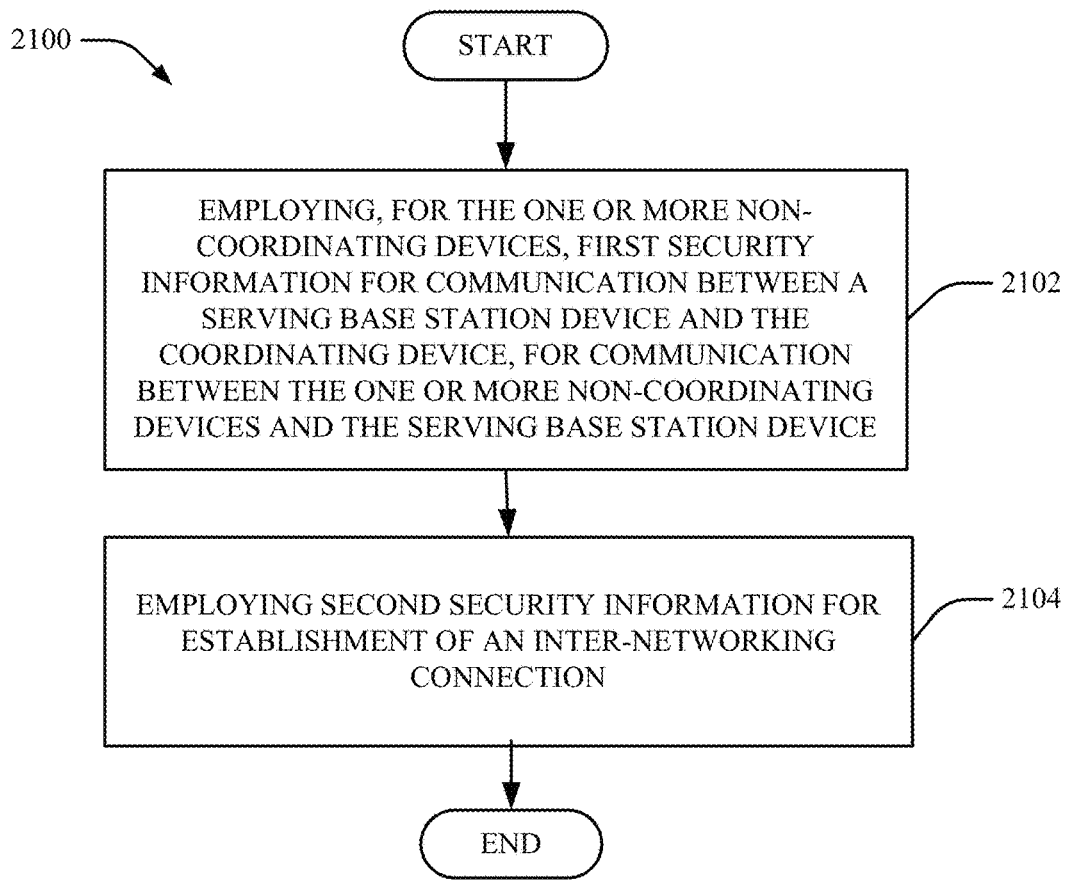

Turning now to FIG. 21, a method of negotiating the security level for the one or more non-coordinating devices is provided. At 2102, method 2100 can include employing, for the one or more non-coordinating devices, first security information for communication between a serving base station device and the coordinating device, for communication between the one or more non-coordinating devices and the serving BS device. At 2104, method 2100 can include employing second security information for establishment of an inner-networking connection.

Figure 22:
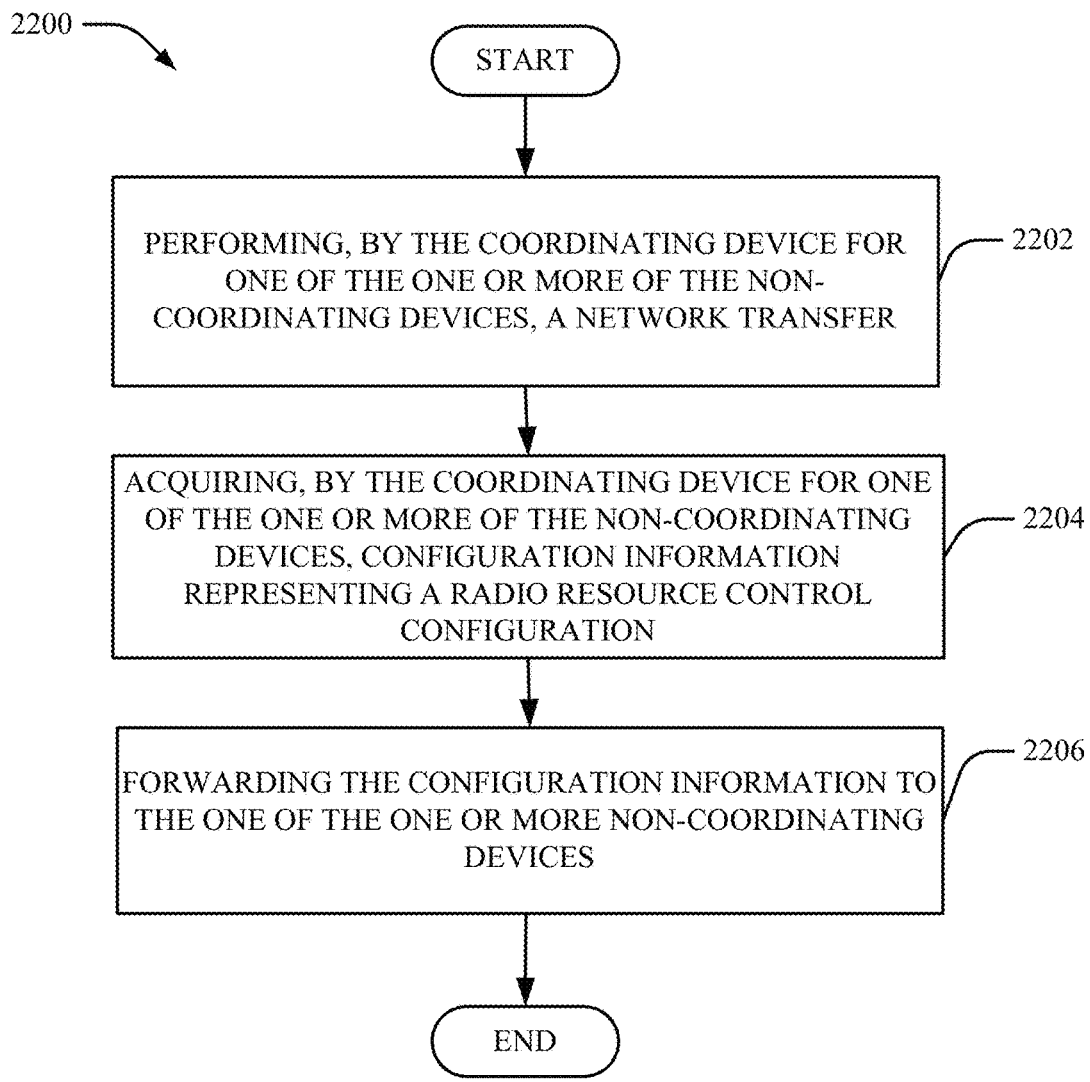

Turning now to FIG. 22, another method of performing mobility management is provided. At 2202, method 2200 can include performing, by the coordinating device for one of the one or more of the non-coordinating devices, a network transfer. At 2204, method 2200 can include acquiring, by the coordinating device for one of the one or more of the non-coordinating devices, configuration information representing a radio resource control configuration. At 2206, method 2200 can include forwarding the configuration information to the one of the one or more non-coordinating devices.

Figure 23:
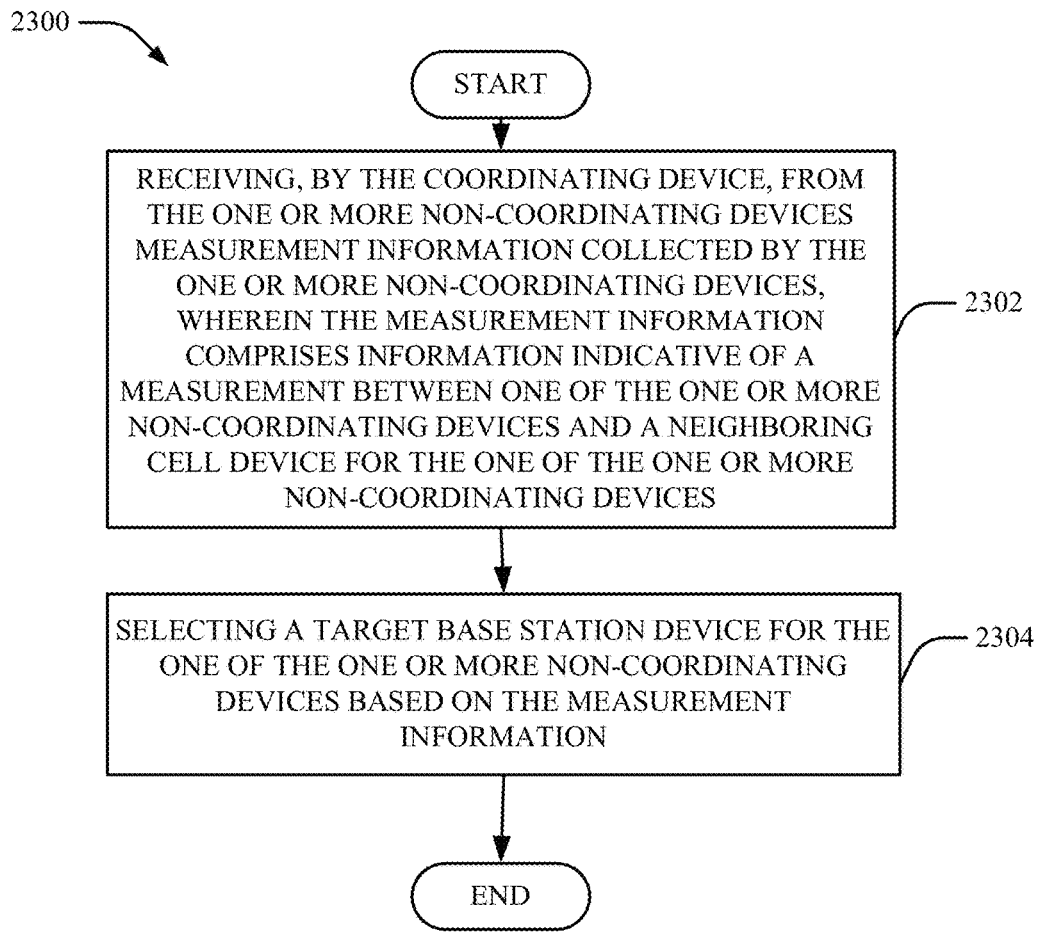

Turning now to FIG. 23, a method of performing mobility management for one or more non-coordinating devices is provided. At 2302, method 2300 can include receiving, by the coordinating device, from the one or more non-coordinating devices measurement information collected by the one or more non-coordinating devices. The measurement information can include information indicative of a measurement between one of the one or more non-coordinating devices and a neighboring cell device for the one of the one or more non-coordinating devices. At 2304, method 2300 can include selecting a target base station device for the one of the one or more non-coordinating devices based on the measurement information.

Figure 24:
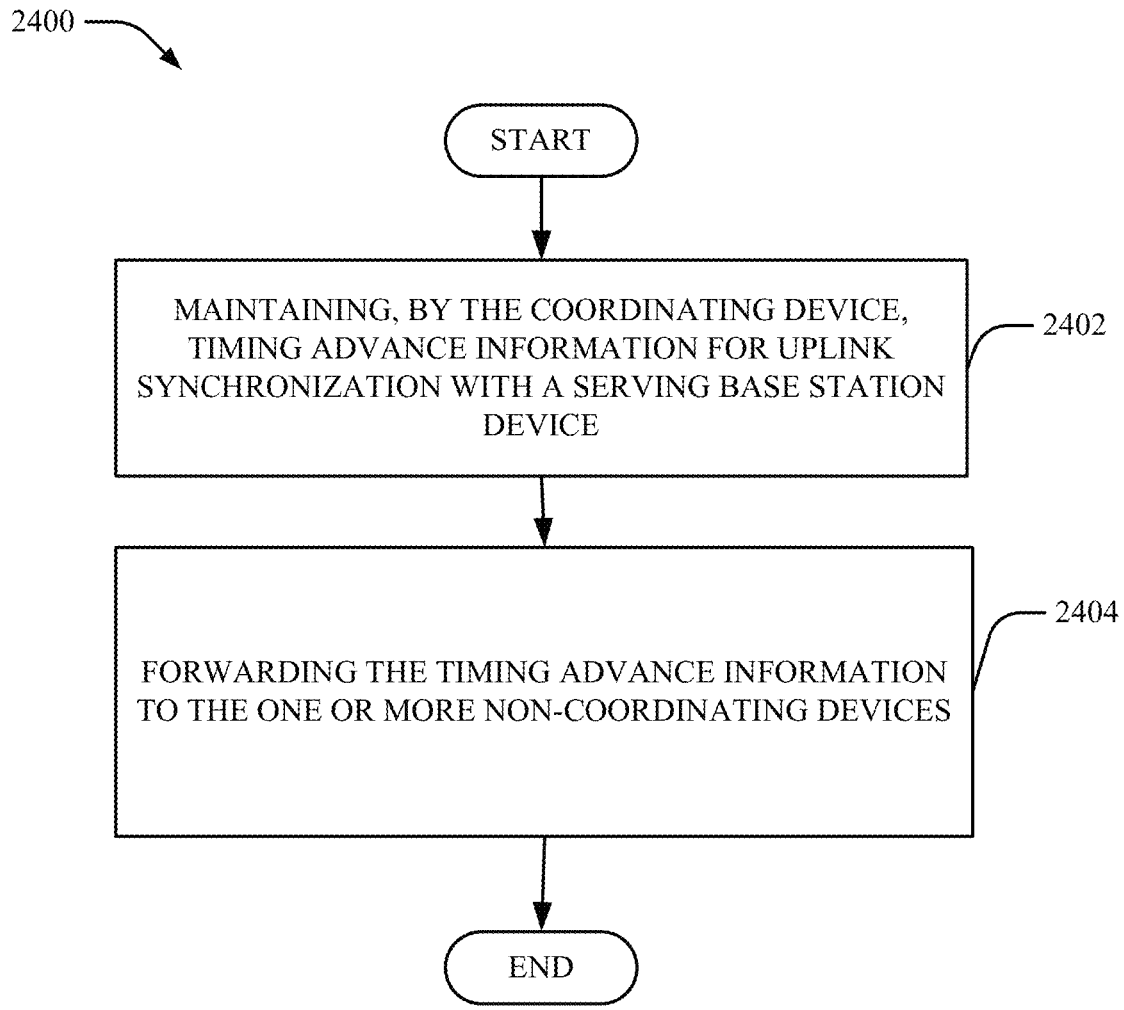

Turning now to FIG. 24, another method of performing mobility management is provided. At 2402, method 2400 can include maintaining, by the coordinating device, timing advance information for uplink synchronization with a serving BS device. At 2404, method 2400 can include forwarding the timing advance information to the one or more non-coordinating devices.

Figure 25:
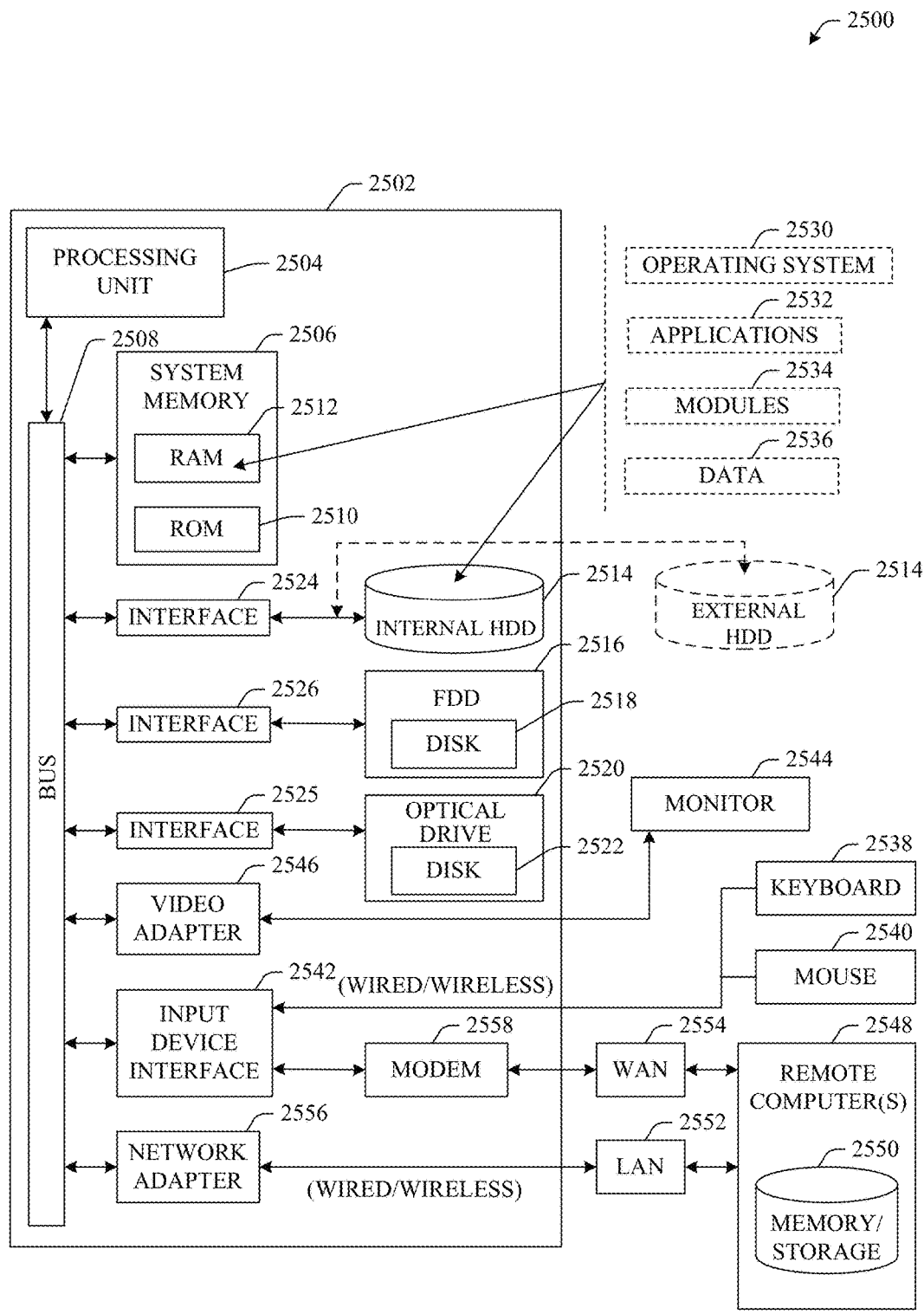
FIG. 25 is an exemplary schematic block diagram illustrating a suitable operating environment to facilitate the MDC described herein.

FIG. 25 illustrates an exemplary environment 2500 for implementing various embodiments as described herein. The exemplary environment can include a computer 2502. The computer 2502 can include a processing unit 2504, a system memory 2506 and a system bus 2508. The system bus 2508 can couple various system components including, but not limited to, coupling the system memory 2506 to the processing unit 2504. The processing unit 2504 can be any of various processors. In some embodiments, dual microprocessors and other multi-processor architectures may also be employed as the processing unit 2504.

The system bus 2508 can be any of several types of bus structure that can interconnect to a memory bus (with or without a memory controller), a peripheral bus, and a local bus using any bus architecture. The system memory 2506 can include read-only memory (ROM) 2510 and random access memory (RAM) 2512. A basic input/output system (BIOS) is stored in a non-volatile memory such as ROM, erasable programmable read only memory (EPROM), electrically erasable programmable read only memory (EEPROM). The BIOS can contain the basic routines that help to transfer information between elements within the computer 2502, such as during start-up. The RAM 2512 can also include a high-speed RAM such as static RAM for caching data.

The computer 2502 can also include an internal hard disk drive (HDD) 2514 (e.g., EIDE, SATA). The internal hard disk drive 2514 can also be configured for external use in a suitable chassis (not shown). The computer 2502 can also include a magnetic floppy disk drive (FDD) 2516, (e.g., to read from or write to a removable diskette 2518) and an optical disk drive 2520, (e.g., reading a CD-ROM disk 2522 or, to read from or write to other high capacity optical media such as the DVD). The hard disk drive 2514, magnetic disk drive 2516 and/or optical disk drive 2520 can be connected to the system bus 2508 by a hard disk drive interface 2524, a magnetic disk drive interface 2526 and/or an optical drive interface 2528. The interface 2524 for external drive implementations can include, but is not limited to, Universal Serial Bus (USB) and IEEE1394 interface technologies. Other external drive connection technologies are within contemplation of the subject matter disclosed herein.

The drives and their associated computer-readable media can provide non-volatile storage of data, data structures and/or computer-executable instructions. For the computer 2502, the drives and media can accommodate the storage of any data in a suitable digital format. Although the description of computer-readable media above refers to a HDD, a removable magnetic diskette, and/or a removable optical media such as a CD or DVD, it should be appreciated by those skilled in the art that other types of media, which are readable by a computer (e.g., zip drives, magnetic cassettes, flash memory cards, cartridges) can also be used in the exemplary operating environment, and further, that any such media can contain computer-executable instructions for performing the methods and/or implementing the systems of the various embodiments.

A number of program modules can be stored in the drives and RAM 2512, including an operating system 2530, one or more application programs 2532, other program modules 2534 and/or program data 2536. All or portions of the operating system, applications, modules, and/or data can also be cached in the RAM 2512. It is appreciated that the various embodiments can be implemented with various different operating systems or combinations thereof.

A user can enter commands and information into the computer 2502 through one or more wired/wireless input devices (e.g., a keyboard 2538 and a pointing device, such as a mouse 2540). Other input devices (not shown) may include a microphone, an IR remote control, a joystick, a game pad, a stylus pen, touch screen or the like. These and other input devices can be connected to the processing unit 2504 through an input device interface 2542 that is coupled to the system bus 2508 in some embodiments. In other embodiments, the input devices can be connected to the processing unit 2504 via other interfaces (e.g., parallel port, an IEEE1394 serial port, a game port, a USB port, an IR interface).

A monitor 2544 or other type of display device can be connected to the system bus 2508 via an interface, such as a video adapter 2546. In addition to the monitor 2544, other peripheral output devices (not shown) (e.g., speakers, printers) can be connected to the system bus 2508.

The computer 2502 can operate in a networked environment using logical connections via wired and/or wireless communications to one or more remote computers, such as a remote computer 2548. The remote computer 2548 can be a workstation, a server computer, a router, a personal computer, portable computer, microprocessor-based entertainment appliance, a peer device and/or other common network node. The remote computer 2548 can include one or more of the elements described for the computer 2502, although, for purposes of brevity, only a memory/storage device 2550 is illustrated. The logical connections depicted can include wired/wireless connectivity to a local area network (LAN) 2552 and/or larger networks, such as wide area network (WAN) 2554. Such LAN and WAN networking environments are commonplace in offices and companies, and can facilitate enterprise-wide computer networks, such as intranets. The LAN, WAN and other networking environments can connect to a global communications network (e.g., the Internet).

When used in a LAN networking environment, the computer 2502 can be connected to the local network 2552 through a wired and/or wireless communication network interface or adapter 2556. The adapter 2556 can facilitate wired or wireless communication to the LAN 2552, which can also include a wireless access point disposed thereon for communicating with the wireless adapter 2556.

When used in a WAN networking environment, the computer 2502 can include a modem 2558, can be connected to a communications server on the WAN 2554 and/or can have other functionality and/or structure for establishing communications over the WAN 2554. The modem 2558, which can be internal or external, and which can be a wired or wireless device, can be connected to the system bus 2508 via the serial port interface 2542. In a networked environment, program modules depicted relative to the computer 2502, or portions thereof, can be stored in the remote memory/ storage device 2550. It will be appreciated that the network connections shown are exemplary and other functionality and/or structure for establishing a communications link between the computers can be used.

The computer 2502 can be operable to communicate with any wireless devices or entities operatively disposed in wireless communication (e.g., a printer, scanner, desktop and/or portable computer, portable data assistant, communications satellite, any piece of equipment or location associated with a wirelessly detectable tag (e.g., a kiosk, news stand, restroom) and telephone). Such can include, but is not limited to, Wi-Fi (Wireless Fidelity) and/or BLUETOOTH™ wireless technologies. Thus, the communication can be a predefined structure as with a conventional network or simply an ad hoc communication between at least two devices.

Wi-Fi can allow connection to the Internet from a couch at home, a bed in a hotel room, or a conference room at work, without wires. Wi-Fi is a wireless technology similar to that used in a cell phone that enables such devices to send and receive data indoors and out and/or anywhere within the range of a BS. Wi-Fi networks can use radio technologies called IEEE802.11(a, b, g, n, etc.) to provide secure, reliable, fast wireless connectivity. A Wi-Fi network can be used to connect computers to each other, to the Internet, and/or to wired networks (which can use IEEE802.3 or Ethernet). Wi-Fi networks can operate in the unlicensed 2.4 and 5 GHz radio bands, at an 11 Mbps (802.11a) or 54 Mbps (802.11b) data rate, for example, or with products that contain both bands (dual band). As such, networks employing Wi-Fi technology can provide real-world performance similar to the basic 10BaseT wired Ethernet networks used in many offices.

It is to be appreciated and understood that components as described with regard to a particular system or method, can include the same or similar functionality as respective components as described with regard to other systems or methods disclosed herein.

As it employed in the specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration or service policies and specifications; privacy policies; and so forth. It will be appreciated that the memory components described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), phase change memory (PCM), flash memory, or non-volatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various embodiments or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD), Blu-ray disc), smart cards, and flash memory devices (e.g., card, stick, key drive).

What has been described above includes exemplary various embodiments. It is, of course, not possible to describe every conceivable combination of components or methods for purposes of describing the embodiments, but one of ordinary skill in the art can recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including any references to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary embodiments of the embodiments. In this regard, it will also be recognized that the embodiments includes a system as well as a computer-readable medium having computer-executable instructions for performing the acts and/or events of the various methods.

In addition, while a particular feature can have been disclosed with respect to only one of several implementations, such feature can be combined with one or more other features of the other implementations as can be desired and advantageous for any given or particular application. Furthermore, to the extent that the terms "includes," and "including" and variants thereof are used in either the detailed description or the claims, these terms are intended to be inclusive in a manner similar to the term "comprising", such as, for example, as the term "comprising" is interpreted when employed as a transitional word in a claim.

Figure 26:
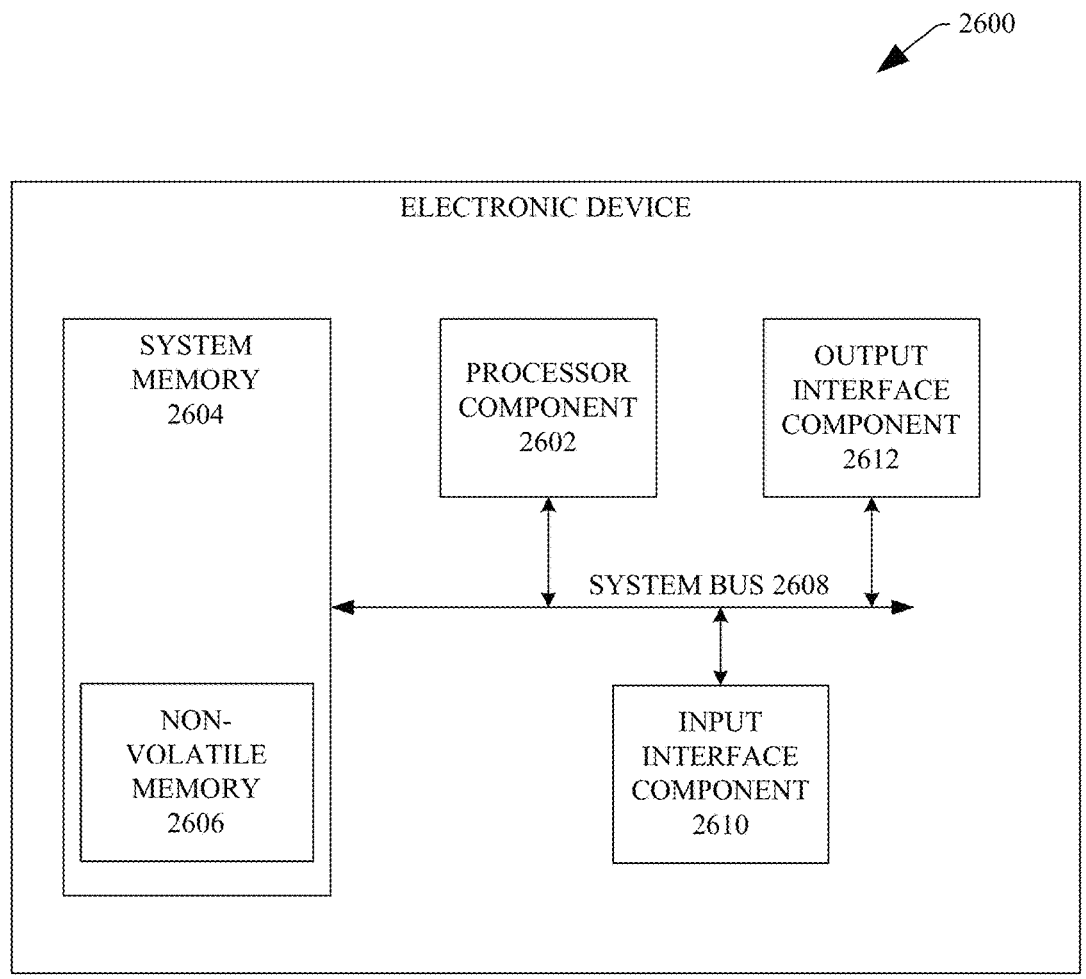
FIG. 26 is a block diagram of an exemplary electronic device that can facilitate MDC for wireless network components in accordance with one or more embodiments of the disclosed subject matter.

Referring to FIG. 26, illustrated is a block diagram of an exemplary, non-limiting electronic device 2600 that can perform MDC for wireless network components in accordance with an aspect of the disclosed subject matter. The electronic device 2600 can include, but is not limited to, a central control unit (e.g., central control unit 200), a BS, a mobile device, a computer, a laptop computer, or network equipment (e.g., routers, access points, femtocells, picocells) and the like.

Components of the electronic device 2600 can include, but are not limited to, a processor component 2602, a system memory 2604 (with non-volatile memory 2606), and a system bus 2608 that can couple various system components including the system memory 2604 to the processor component 2602. The system bus 2608 can be any of various types of bus structures including a memory bus or memory controller, a peripheral bus, or a local bus using any of a variety of bus architectures.

Computing devices typically include a variety of media, which can include computer-readable storage media or communications media, which two terms are used herein differently from one another as follows.

Computer-readable storage media can be any available storage media that can be accessed by the computer and includes both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal (e.g., a carrier wave or other transport mechanism) and includes any information delivery or transport media. The terms "modulated data signal" or "signals" refer to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 2604 can include computer-readable storage media in the form of volatile and/or non-volatile memory 2606. A basic input/output system (BIOS), containing the basic routines that help to transfer information between elements within electronic device 2600, such as during start-up, can be stored in memory 2604. Memory 2604 can typically contain data and/or program modules that can be immediately accessible to and/or can be operated on by processor component 2602. By way of example, and not limitation, system memory 2604 can also include an operating system, application programs, other program modules, and program data. As a further example, system memory can include program modules for MDC.

The non-volatile memory 2606 can be removable or non-removable. For example, the non-volatile memory 2606 can be in the form of a removable memory card or a USB flash drive. In accordance with one aspect, the non-volatile memory 2606 can include flash memory (e.g., single-bit flash memory, multi-bit flash memory), ROM, PROM, EPROM, EEPROM, and/or NVRAM (e.g., FeRAM), or a combination thereof, for example. Further, the flash memory can include NOR flash memory and/or NAND flash memory.

A user can enter commands and information into the electronic device 2600 through input devices (not illustrated) such as a keypad, microphone, tablet or touch screen although other input devices can also be utilized. These and other input devices can be connected to the processor component 2602 through input interface component 2610 that can be connected to the system bus 2608. Other interface and bus structures, such as a parallel port, game port or a universal serial bus (USB) can also be utilized. A graphics subsystem (not illustrated) can also be connected to the system bus 2608. A display device (not illustrated) can be also connected to the system bus 2608 via an interface, such as output interface component 2612, which can in turn communicate with video memory. In addition to a display, the electronic device 2600 can also include other peripheral output devices such as speakers (not illustrated), which can be connected through output interface component 2612. In an aspect, other electronic devices, e.g., other BSs and/or mobile devices in a network can be communicatively coupled to electronic device 1500 by way of input interface component 2610 and output interface component 2612, which can facilitate transfer of feedback and/or MDC information.

It is to be understood and appreciated that the computer-implemented programs and software can be implemented within a standard computer architecture. While some aspects of the disclosure have been described above in the general context of computer-executable instructions that can run on one or more computers, those skilled in the art will recognize that the technology also can be implemented in combination with other program modules and/or as a combination of hardware and software.

Generally, program modules include routines, programs, components and/or data structures that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick, key drive). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description can have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A method, comprising:
   identifying, by a coordinating device comprising a processor, one or more non-coordinating devices of a network and associated with a same entity; and
   coordinating a single, shared radio connection to which the coordinating device and the one or more non-coordinating devices are communicatively coupled, wherein the coordinating comprises one or more operations associated with an initialization stage, a management stage or a transmission stage, wherein the coordinating device and the one or more non-coordinating devices comprise a set of candidate devices, and wherein the initialization stage comprises a stage in which a device of the set of candidate devices performs operations comprising:
      detecting respective proximities between the device and other devices of the set of candidate devices;
      selecting a coordinating device from the set of candidate devices, wherein the set of candidate devices, other than the coordinating device, are the one or more non-coordinating devices; and
      negotiating a capability of the device.

2. The method of claim 1, wherein the selecting is based on at least one of respective battery lives of the set of candidate devices, respective powers of transceivers of the set of candidate devices, a shortest distance between the set of candidate devices, a shortest distance between a base station to which the set of candidate devices is communicatively coupled, respective screen sizes associated with the set of candidate devices or respective entity configurations of the set of candidate devices.

3. The method of claim 1, wherein the negotiating the capability comprises the device transmitting a request message to a base station device associated with the device, wherein the device is one of the one or more non-coordinating devices, and wherein the method further comprises receiving, by the coordinating device, information indicative of the capability of the device based on the transmitting the request message.

4. The method of claim 1, wherein the method further comprises:
   transmitting, by the coordinating device, a request message to a base station device to acquire direct-to-direct communication;
   determining, by the coordinating device, that a resource associated with the direct-to-direct communication is granted; and
   negotiating, by the coordinating device with the one or more non-coordinating devices, regarding respective capabilities of the one or more non-coordinating devices, wherein the negotiating is performed after the determining that the resource associated with the direct-to-direct communication is granted.

5. The method of claim 1, wherein the method further comprises:
   negotiating, by the coordinating device, with the one or more non-coordinating devices employing a radio access technology.

6. The method of claim 1, wherein the coordinating device and the one or more non-coordinating devices comprise a set of candidate devices, and wherein the management stage comprises a stage in which the coordinating device performs operations comprising at least one of: negotiating a security level for the one or more non-coordinating devices, transmitting feedback information associated with the coordinating device, determining a type of inner-networking connection between the coordinating device and the one or more non-coordinating devices or performing mobility management for the one or more non-coordinating devices.

7. The method of claim 6, wherein the determining the type of inner-networking connection between the coordinating device and the one or more non-coordinating devices comprises:
   identifying ones of the one or more non-coordinating devices with which to perform direct-to-direct communication between the coordinating device and the one or more non-coordinating devices based on at least one of a token-based rule, a polling-based rule or a carrier sense multiple access with collision avoidance-based rule.

8. The method of claim 6, wherein the negotiating the security level for the one or more non-coordinating devices comprises:
   employing, for the one or more non-coordinating devices, first security information for communication between a serving base station device and the coordinating device, for communication between the one or more non-coordinating devices and the serving base station device; and
   employing second security information for establishment of an inner-networking connection.

9. The method of claim 6, wherein the performing mobility management for the one or more non-coordinating devices comprises: maintaining, by the coordinating device, timing advance information for uplink synchronization with a serving base station device; and
   forwarding the timing advance information to the one or more non-coordinating devices.

10. The method of claim 6, wherein the performing mobility management for the one or more non-coordinating devices comprises:
   receiving, by the coordinating device, from the one or more non-coordinating devices measurement information collected by the one or more non-coordinating devices, wherein the measurement information comprises information indicative of a measurement between one of the one or more non-coordinating devices and a neighboring cell device for the one of the one or more non-coordinating devices; and
   selecting a target base station device for the one of the one or more non-coordinating devices based on the measurement information.

11. The method of claim 6, wherein the performing mobility management for the one or more non-coordinating devices comprises:
   performing, by the coordinating device for one of the one or more of the non-coordinating devices, a network transfer;
   acquiring, by the coordinating device for one of the one or more of the non-coordinating devices, configuration information representing a radio resource control configuration; and
   forwarding the configuration information to the one of the one or more non-coordinating devices.

12. The method of claim 6, wherein the transmitting the feedback information comprises the coordinating device transmitting, for the coordinating device, to a serving base station device for the coordinating device, channel quality information, acknowledgement information or a scheduling request.

13. The method of claim 1, wherein the coordinating device and the one or more non-coordinating devices comprise a set of candidate devices, and wherein the transmission stage comprises a stage in which the coordinating device performs operations comprising at least one of determining a transmission mode, applying a cooperative hybrid automatic repeat request protocol or determining a parameter to associate with one of the one or more non-coordinating devices for discontinuous transmission and reception operation.

14. The method of claim 13, wherein the transmission mode comprises at least one of: a first mode in which the one or more non-coordinating devices are communicatively coupled to a same base station device and perform parallel transmission of a same packet, a second mode in which the one or more non-coordinating devices are communicatively coupled to the same base station device and perform sequential transmission of one or more packets, a third mode in which dual connectivity is established wherein at least one of the one or more non-coordinating devices is communicatively coupled to a cell device and at least one of the one or more non-coordinating devices is communicatively coupled to a base station device or a fourth mode in which dual connectivity is established wherein at least one of the one or more non-coordinating devices is communicatively coupled to the cell device and sequential transmission is performed with the one or more packets.

15. The method of claim 13, wherein the applying a cooperative hybrid automatic repeat request protocol comprises applying an amplify-and-forwarding relaying protocol or applying a decode-and-forwarding relaying protocol, wherein the decode-and-forwarding relaying protocol is selective, and wherein a destination device attempts decoding of a packet and requests relaying for retransmission based on an unsuccessful attempted decoding.

16. The method of claim 13, wherein the parameter being associated with the one of the one or more non-coordinating devices for discontinuous transmission and reception operation comprises a discontinuous reception parameter configured by a serving base station device, and wherein the determining the parameter further comprises determining, by the coordinating device, other discontinuous reception parameters for others of the one or more non-coordinating devices based on the discontinuous reception parameter configured by the serving base station device.

17. The method of claim 1, wherein the method further comprises:
   releasing, by the non-coordinating device, a wireless connection with a serving network after negotiating capabilities with the coordinating device.

18. An apparatus, comprising:
   a coordinating device comprising a processing device configured to at least:
      identify one or more non-coordinating devices in a network and associated with a same entity; and
      coordinate a single, shared radio connection to which the coordinating device and the one or more non-coordinating devices are communicatively coupled, wherein coordination of the single, shared radio connection comprises one or more operations associated with initialization, management or transmission, wherein the transmission comprises a stage in which the coordinating device performs operations comprising: a first mode in which the one or more non-coordinating devices are communicatively coupled to a same base station device and perform parallel transmission of a same packet or a second mode in which the one or more non-coordinating devices are communicatively coupled to the same base station device and perform sequential transmission of one or more packets.

19. The apparatus of claim 18, wherein the coordinating device is selected from among a set of candidate devices comprising the coordinating device and the one or more non-coordinating devices based on at least one of respective battery reserves of the set of candidate devices, respective powers of transceivers of the set of candidate devices, a shortest distance between the set of candidate devices, a shortest distance between a base station device to which the set of candidate devices is communicatively coupled, respective screen sizes associated with the set of candidate devices or respective entity configurations of the set of candidate devices.

20. The apparatus of claim 18, wherein the coordinating device is further configured to receive information indicative of capabilities of the one or more non-cooperating devices based on the one or more non-cooperating devices transmitting request messages to an associated base station device to negotiate capabilities of the one or more non-cooperating devices.

21. The apparatus of claim 18, wherein the coordinating device is further configured to:
    transmit a request message to the associated base station device to acquire direct-to-direct communication;
    determine that a resource associated with the direct-to-direct communication is granted; and
    negotiate with the one or more non-coordinating devices regarding respective capabilities of the one or more non-coordinating devices, wherein the negotiating is performed after determination that the resource associated with the direct-to-direct communication is granted.

22. The apparatus of claim 18, wherein the coordinating device is further configured to:
    negotiate with the one or more non-coordinating devices employing radio access technology.

23. A non-transitory computer-readable storage medium having computer-executable instructions stored thereon that, in response to execution, cause a coordinating device to perform operations, comprising:
    identifying one or more non-coordinating devices of a network and associated with a same entity;
    coordinating a single, shared radio connection to which the coordinating device and the one or more non-coordinating devices are communicatively coupled, wherein coordination of the single, shared radio connection comprises one or more operations associated with initialization, management or transmission;
    transmitting a request message to the associated base station device to acquire direct-to-direct communication;
    determining that a resource associated with the direct-to-direct communication is granted; and
    negotiating with the one or more non-coordinating devices regarding respective capabilities of the one or more non-coordinating devices, wherein the negotiating is performed after determination that the resource associated with the direct-to-direct communication is granted.

24. The non-transitory computer-readable storage medium of claim 23, wherein the operations performed during the transmission comprise operations associated with a first mode in which the one or more non-coordinating devices are communicatively coupled to a same base station device and perform parallel transmission of a same packet or operations associated with a second mode in which the one or more non-coordinating devices are communicatively coupled to the same base station device and perform sequential transmission of one or more packets.

25. The non-transitory computer-readable storage medium of claim 23, wherein the operations performed during the transmission comprise operations associated with a first mode in which dual connectivity is established wherein at least one of the one or more non-coordinating devices is communicatively coupled to a cell device and at least one of the one or more non-coordinating devices is communicatively coupled to a base station device or a second mode in which dual connectivity is established wherein at least one of the one or more non-coordinating devices is communicatively coupled to the cell device and sequential transmission is performed with one or more packets.

26. The non-transitory computer-readable storage medium of claim 23, wherein the operations performed during the transmission comprise:
    determining a discontinuous reception parameter configured by a serving base station device for one of the one or more non-coordinating devices; and
    determining a plurality of discontinuous reception parameters for others of the one or more non-coordinating devices based on the discontinuous reception parameter configured by the serving base station device.

27. The non-transitory computer-readable storage medium of claim 23, wherein the operations performed during the management comprise:
    identifying first security information for communication between a serving base station device and the coordinating device, for communication between the one or more non-coordinating devices and the serving base station device; and
    identifying second security information for establishment of an inner-networking connection.

28. The non-transitory computer-readable storage medium of claim 23, wherein the operations performed during the management comprise:
    receiving from the one or more non-coordinating devices measurement information collected by the one or more non-coordinating devices, wherein the measurement information comprises information indicative of a measurement between one of the one or more non-coordinating devices and a neighboring cell device for the one of the one or more non-coordinating devices; and
    selecting a target base station device for the one of the one or more non-coordinating devices based on the measurement information.

* * * * *